United States Patent
Nakamura et al.

[11] Patent Number: 5,633,390
[45] Date of Patent: May 27, 1997

[54] SILVER HALIDE PHOTOGRAPHIC MATERIAL CONTAINING PYRAZOLONE-PENTAMETHINE OXONOL DYE

[75] Inventors: Tetsuo Nakamura; Shigeru Ohno; Kiyoshi Kawai, all of Kanagawa, Japan

[73] Assignee: Fuji Photo Film Co., Ltd., Kanagawa, Japan

[21] Appl. No.: 679,907

[22] Filed: Jul. 15, 1996

Related U.S. Application Data

[62] Division of Ser. No. 516,402, Aug. 17, 1995, Pat. No. 5,563,028.

[30] Foreign Application Priority Data

Aug. 17, 1994 [JP] Japan .................. 6-214314

[51] Int. Cl.⁶ .................................. C07D 231/24
[52] U.S. Cl. ....................................... 548/365.4
[58] Field of Search ........................... 548/365.4

[56] References Cited

U.S. PATENT DOCUMENTS

| | | |
|---|---|---|
| 4,996,138 | 2/1991 | Murai et al. . |
| 5,204,236 | 4/1993 | Kawashima et al. . |
| 5,238,799 | 8/1993 | Usami . |
| 5,314,796 | 5/1994 | Murai et al. . |
| 5,356,766 | 10/1994 | Idogaki . |

FOREIGN PATENT DOCUMENTS

| | | |
|---|---|---|
| 0476928 | 3/1992 | European Pat. Off. . |
| 0510960 | 10/1992 | European Pat. Off. . |
| 0571959 | 12/1993 | European Pat. Off. . |
| 91627 | 7/1975 | Japan . |

*Primary Examiner*—Robert W. Ramsuer
*Attorney, Agent, or Firm*—Sughrue, Mion, Zinn, Macpeak & Seas

[57] ABSTRACT

The pyrazolone-pentamethine oxonol compound represented by the formula (Ib):

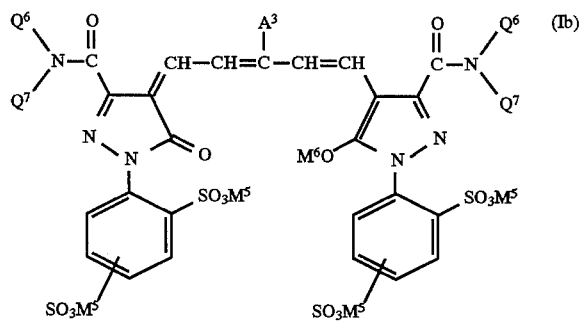

in which $A^3$ is methyl, ethyl or sulfoethyl; each of $Q_6$ and $Q_7$ independently is hydrogen, methyl, ethyl or sulfoethyl; $M^5$ is sodium or potassium; and $M^6$ is hydrogen, sodium or potassium.

5 Claims, No Drawings

SILVER HALIDE PHOTOGRAPHIC MATERIAL CONTAINING PYRAZOLONE-PENTAMETHINE OXONOL DYE

This is a divisional of application Ser. No. 08/516,402 filed Aug. 17, 1995 now U.S. Pat. No. 5,563,028.

FIELD OF THE INVENTION

The present invention relates to a silver halide photographic material containing a pyrazolone-pentamethine oxonol dye.

BACKGROUND OF THE INVENTION

A silver halide photographic material comprises at lease one silver halide emulsion layer and at least one non-light-sensitive hydrophilic colloidal layer provided on a support. The silver halide emulsion layer or the hydrophilic colloidal layer often contains a dye, which absorbs a light of a specific wavelength. The dye has a function of controlling spectrum of light incident on the emulsion layer, adjusting light absorption (in a filter layer), preventing halation or irradiation or adjusting the sensitivity of the emulsion layer.

The dye used in a photographic material must satisfy the following conditions:

(1) The dyes have a spectral absorption suitable for their use.
(2) The dyes are inactive chemical compounds in photographic reactions. For example, the dyes should not have adverse chemical effects on silver halide emulsion layers. The adverse effects include reduction of sensitivity, regression of latent image and fog. Further, the dyes should be inactive with a coupler or a developing agent.
(3) The dyes are bleached or dissolved in a processing solution or a washing water. The dyes should not remain in the processed photographic material.
(4) The dyes are stable in a solution or in a photographic material. The color of the dyes should not be faded nor discolored.

A cyan dye has recently been used in a silver halide photographic material to improve the sharpness of a red sensitive emulsion layer. In this case, the condition (1) is particularly necessary. The cyan dye must have an absorption maximum of a spectrum in the range of 680 to 720 nm to improve the red sensitive layer effectively without decreasing the sensitivities of blue and green sensitive layers.

Therefore, various cyan dyes have been searched and developed to satisfy the above-mentioned conditions. Some pyrazolone-pentamethine oxonol dyes satisfy most of the conditions. Japanese Patent Publication No. 51(1976)-46607 discloses pyrazolone-pentamethine oxonol dyes, wherein an alkoxycarbonyl group is attached to the 3-position of pyrazolone. Japanese Patent Publication No. 60(1985)-53304 discloses pyrazolone-pentamethine oxonol dyes, wherein cyano is attached to the 3-position of pyrazolone. Japanese Patent Provisional Publication No. 62(1987)-273527 discloses pyrazolone-pentamethine oxonol dyes, wherein an acyl group is attached to the 3-position of pyrazolone. Japanese Patent Provisional Publications No. 58(1983)-143342, No. 2(1990)-97940 and Japanese Patent Publication No. 3(1991)-40371 disclose pyrazolone-pentamethine oxonol dyes, wherein a carbamoyl group is attached to the 3-position of pyrazolone. Particularly, Japanese Patent Publication No. 2(1990)-97940 (corresponding to U.S. Pat. No. 4,996,138, Murai et al.) discloses various (103) examples of the pyrazolone-pentamethine oxonol dyes.

However, the disclosed dyes do not completely satisfy the conditions. Some dyes do not satisfy the condition (1), namely they do not have an absorption maximum of a spectrum in the range of 680 to 720 nm. Other dyes do not satisfy the condition (3), namely it is difficult to bleach or dissolve them in a processing solution or a washing water. The other dyes do not satisfy the condition (4), namely they are not stable in a coating solution before coating or in a photographic material after coating.

SUMMARY OF THE INVENTION

An object of the invention is to provide a silver halide photographic material containing a pyrazolone-pentamethine oxonol dye that satisfies the conditions: (1) the dye has an absorption maximum of a spectrum in the range of 680 to 720 nm; (2) the dye is inactive in photographic reactions; (3) the dye is bleached or dissolved in a processing solution or a washing water; and (4) the dye is stable in a coating solution or in a photographic material.

The applicants have studied the known pyrazolone-pentamethine oxonol dyes. As a result, the applicants note the specific relations between the chemical structures of the dyes and the conditions (1), (3) and (4). First, an alkyl group or an aryl group should be attached to the central (meso) methine group of the pentamethine moiety to satisfy the condition (1). Second, carbamoyl, an alkyl substituted carbamoyl group or a cyclic carbamoyl group should be attached to the 3-position of the pyrazolone moiety to satisfy the conditions (3) and (4). Third, a phenyl group substituted with two or more sulfo groups should be attached to the 1-position of the pyrazolone moiety to satisfy the conditions (3) and (4).

The prior art references, particularly Japanese Patent Publication No. 2(1990)-97940 (corresponding to U.S. Pat. No. 4,996,138, Mural et al.) discloses numerous pyrazolo-nepentamethine oxonol dyes. However, they are silent with respect to the above-mentioned specific relations between the chemical structures of the dyes and the conditions (1), (3) and (4). Therefore, none of the numerous disclosed dyes completely satisfy the conditions.

On the basis of the above-mentioned relations found by the applicants, the present invention provides a silver halide photographic material comprising at least one silver halide emulsion layer and at least one non-light-sensitive hydrophilic colloidal layer provided on a support, wherein the silver halide emulsion layer or the hydrophilic colloidal layer contains a dye represented by the formula (I):

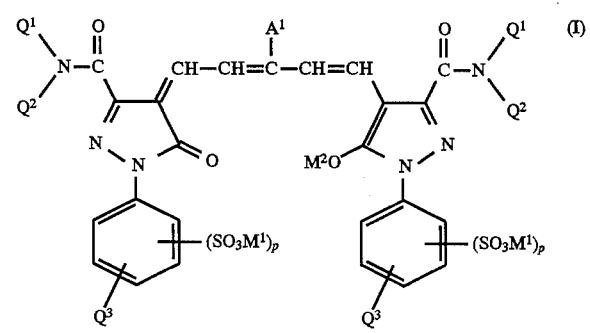

in which $A^1$ is an alkyl group having 1 to 8 carbon atoms, a substituted alkyl group having 1 to 8 carbon atoms, an aryl group having 6 to 10 carbon atoms or a substituted aryl group having 6 to 10 carbon atoms; each of $Q^1$ and $Q^2$ independently is hydrogen, an alkyl group having 1 to 8 carbon atoms or a substituted alkyl group having 1 to 8 carbon atoms, or $Q^1$ and $Q^2$ are combined with each other to form a five or six-membered heterocyclic ring; $Q^3$ is hydrogen, a halogen atom, carboxyl, hydroxyl, methyl or methoxy; each of $M^1$ and $M^2$ independently is hydrogen, a metal atom or an atomic group that forms a monovalent cation; and p is 2, 3 or 4.

The present invention also provides a new pyrazolone-pentamethine oxonol compound represented by the formula (Ib):

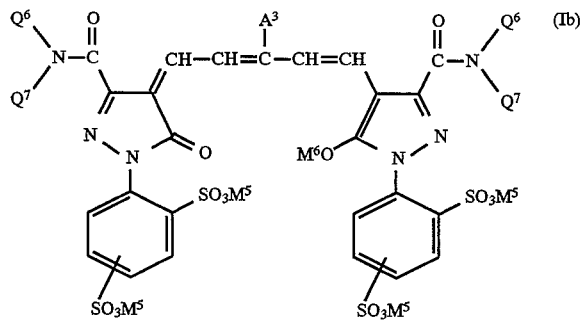

in which $A^3$ is methyl, ethyl or sulfoethyl; each of $Q^6$ and $Q^7$ independently is hydrogen, methyl, ethyl or sulfoethyl; $M^5$ is sodium or potassium; and $M^6$ is hydrogen, sodium or potassium.

The pyrazolone-pentamethine oxonol dye represented by the formula (I) satisfies the above-mentioned conditions (1) to (4). In more detail, the group of $A^1$ satisfies the condition (1). The basic pyrazolone-pentamethine oxonol structure satisfies the condition (2). The group of —$CONQ^1Q^2$ satisfies the conditions (3) and (4). Two or more sulfo groups of $SO_3M^2$ satisfy the conditions (3) and (4).

Therefore, the pyrazolone-pentamethine oxonol dye of the invention has an absorption maximum of a spectrum in the range of 680 to 720 nm. Further, the dye is inactive in photographic reactions. Furthermore, the dye can be bleached or dissolved in a processing solution or a washing water. Moreover, the dye is stable in a coating solution or in a photographic material.

DETAILED DESCRIPTION OF THE INVENTION

The pyrazolone-pentamethine oxonol dye represented by the formula (I) is described below.

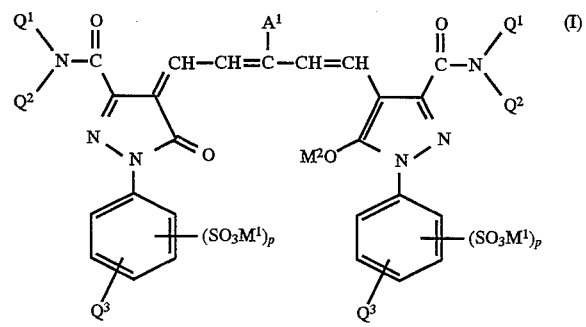

In the formula (I), $A^1$ is an alkyl group having 1 to 8 (preferably 1 to 3) carbon atoms, a substituted alkyl group having 1 to 8 (preferably 1 to 3) carbon atoms, an aryl group having 6 to 10 carbon atoms or a substituted aryl group having 6 to 10 carbon atoms. The alkyl group and the substituted alkyl group are preferred.

The alkyl group preferably has a straight chain structure or a branched chain structure, though the alkyl group may have a cyclic structure. Examples of the alkyl groups include methyl, ethyl, propyl, isopropyl, butyl, tert-butyl, hexyl and octyl. Methyl and ethyl are preferred.

The alkyl moiety of the substituted alkyl group is the same as the above-mentioned alkyl group. Examples of the substituent groups of the substituted alkyl groups include a halogen atom (e.g., fluorine, chlorine, bromine), hydroxyl, carboxyl, sulfo, cyano, an aryl group having 6 or 7 carbon atoms (e.g., phenyl, p-tolyl), an alkoxy group having 1 to 7 carbon atoms (e.g., methoxy, ethoxy, butoxy), an alkoxy carbonyl group having 2 to 7 carbon atoms (e.g., methoxycarbonyl, ethoxycarbonyl), amino and a substituted amino group having 1 to 7 carbon atoms (e.g., dimethylamino, diethylamino). A preferred substituted alkyl group is sulfoethyl.

The examples of the aryl groups include phenyl, 1-naphthyl and 2-naphthyl. Phenyl is preferred.

The aryl moiety of the substituted aryl group is the same as the above-mentioned aryl group. Examples of the substituent groups of the substituted aryl groups include a halogen atom (e.g., fluorine, chlorine, bromine), hydroxyl, carboxyl, sulfo, cyano, an alkyl group having 1 or 4 carbon atoms (e.g., methyl, ethyl, butyl), an alkoxy group having 1 to 4 carbon atoms (e.g., methoxy, ethoxy, butoxy), an alkoxy carbonyl group having 2 to 4 carbon atoms methoxycarbonyl, ethoxycarbonyl), amino and a substituted amino group having 1 to 4 carbon atoms (e.g., dimethylamino, diethylamino).

In the formula (I), each of $Q^1$ and $Q^2$ independently is hydrogen, an alkyl group having 1 to 8 (preferably 1 to 5, more preferably 1 to 3) carbon atoms or a substituted alkyl group having 1 to 8 (preferably 1 to 5, more preferably 1 to 3) carbon atoms, or $Q^1$ and $Q^2$ are combined with each other to form a five or six-membered heterocyclic ring. Hydrogen, the alkyl group and the substituted alkyl group are preferred. The definitions and the examples of the alkyl group and the substituted alkyl group are the same as those described about $A^1$. Preferred alkyl groups are methyl and ethyl, and methyl is particularly preferred. Preferred substituted alkyl groups are hydroxyethyl, carboxyethyl, sulfoethyl, methoxyethyl and ethoxycarbonyl-methyl, and sulfoethyl is particularly preferred.

Examples of the heterocyclic ring formed by $Q^1$ and $Q^2$ include pyrrolidine ring, piperidine ring, morpholine ring and piperazine ring. Pyrrolidine ring, piperidine ring and morpholine ring are preferred. The heterocyclic ring may have a substituent group. Examples of the substituent groups include an alkyl group having 1 or 4 carbon atoms (e.g., methyl, ethyl, butyl), a halogen atom (e.g., fluorine, chlorine, bromine), hydroxyl, carboxyl, sulfo, cyano, an aryl group having 6 or 7 carbon atoms (e.g., phenyl, p-tolyl), an alkoxy group having 1 to 7 carbon atoms (e.g., methoxy, ethoxy, butoxy), an alkoxy carbonyl group having 2 to 7 carbon atoms (e.g., methoxycarbonyl, ethoxycarbonyl), amino and a substituted amino group having 1 to 7 carbon atoms (e.g., dimethylamino, diethylamino).

In the formula (I), $Q^3$ is hydrogen, a halogen atom, carboxyl, hydroxyl, methyl or methoxy. Hydrogen, methyl, carboxyl and methoxy are preferred. Hydrogen is particularly preferred.

In the formula (I), each of $M^1$ and $M^2$ independently is hydrogen, a metal atom or an atomic group that forms a monovalent cation. Examples of the metal atoms include alkali metals (e.g., lithium, sodium, potassium). Examples of the atomic groups that form monovalent cations include ammonium, tnmethylammonium and pyridinium. Hydrogen and alkali metals are preferred. $M^1$ more preferably is sodium or potassium. $M^2$ more preferably is hydrogen, sodium or potassium.

In the formula (I), p is 2, 3 or 4, preferably is 2 or 3, and more preferably is 2. At least one group of $SO_3M^1$ is preferably attached to 2-(or ortho-)position of phenyl attached to the pyrazolone ring.

A preferred compound is represented by the formula (Ia):

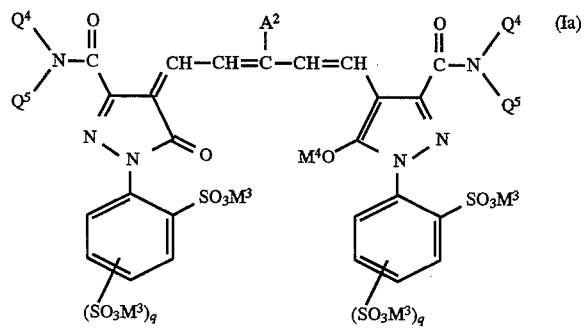

In the formula (Ia), the meanings and the examples of $A^2$, $Q^4$, $Q^5$, $M^3$ and $M^4$ are the same as those of $A^1$, $Q^1$, $Q^2$, $M^1$ and $M^2$, respectively.

In the formula (Ia), q is 1, 2 or 3, preferably is 1 or 2, and more preferably is 1. When q is 1, the group of $SO_3M^3$ having the number q is preferably attached to 4-, 5- or 6-position (more preferably 5-position) of phenyl in addition to the group of $SO_3M^3$ attached to 2-position. A more preferred compound is represented by the formula (Ib):

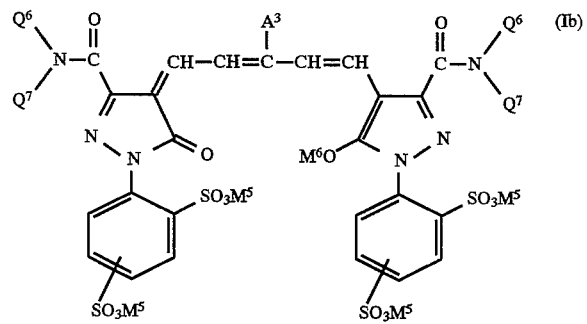

In the formula (Ib), $A^3$ is methyl, ethyl or sulfoethyl; each of $Q^6$ and $Q^7$ independently is hydrogen, methyl, ethyl or sulfoethyl; $M^5$ is sodium or potassium; and $M^6$ is hydrogen, sodium or potassium.

The most preferred compound is represented by the formula (Ic):

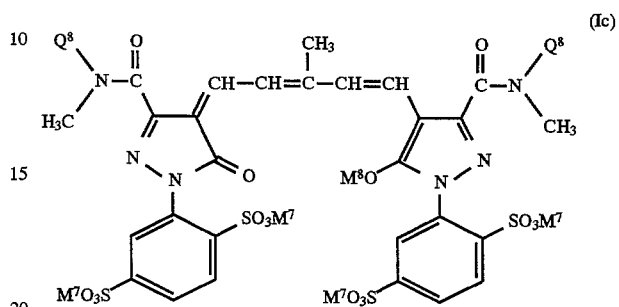

In the formula (Ic), $Q^8$ is hydrogen, methyl, ethyl or sulfoethyl; $M^7$ is sodium or potassium; and $M^8$ is hydrogen, sodium or potassium.

Examples of the compounds are shown below.

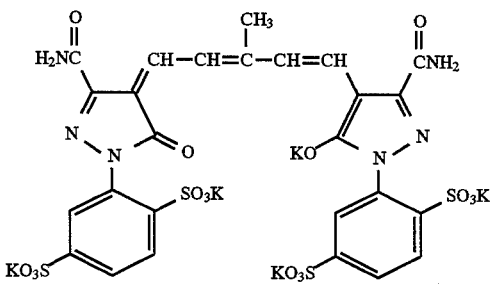

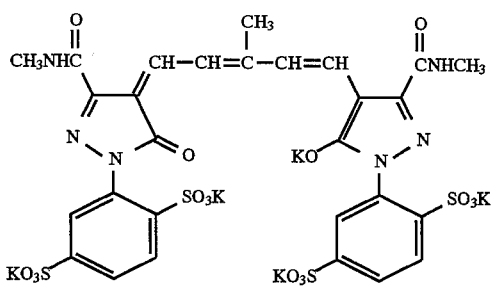

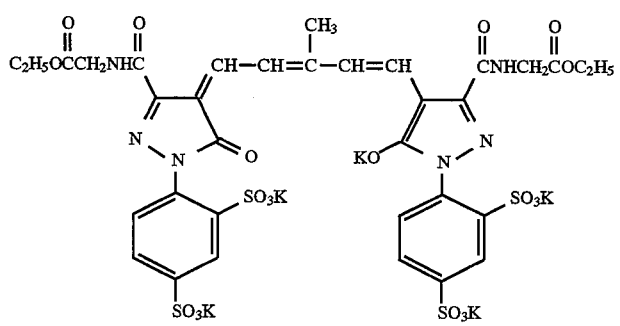
(3)
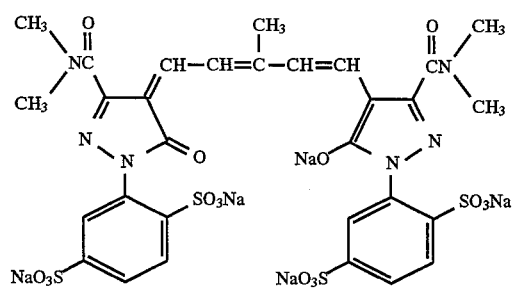
(4)
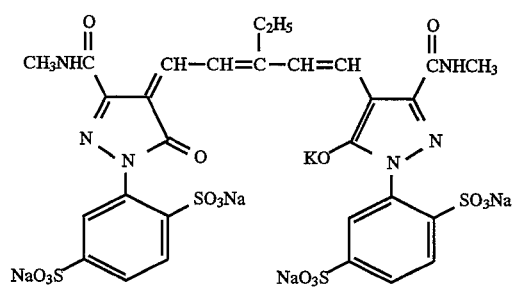
(5)
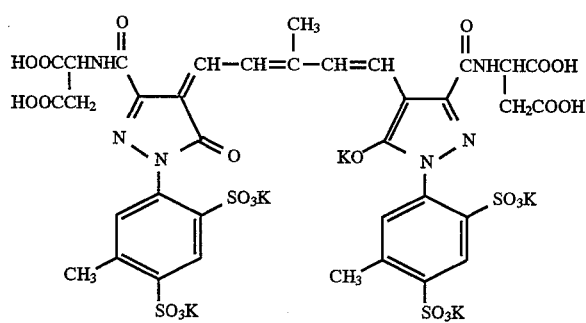
(6)
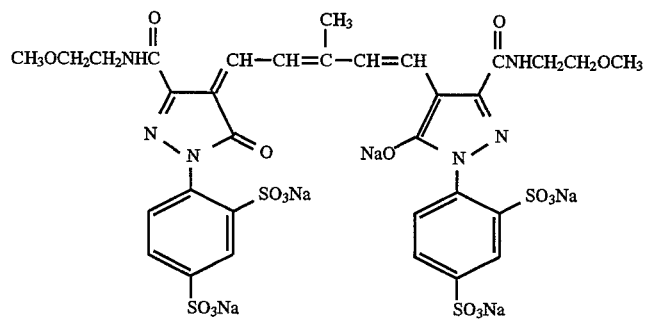
(7)

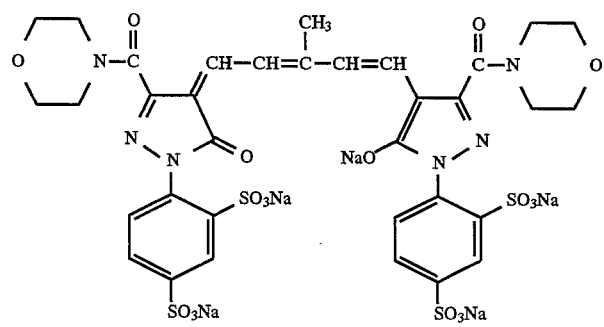
(8)
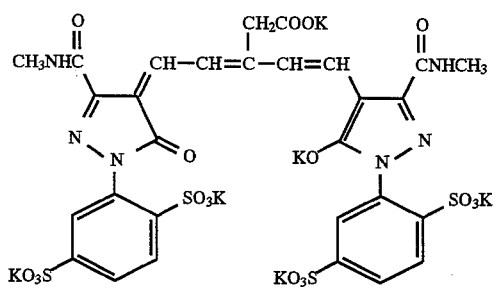
(9)
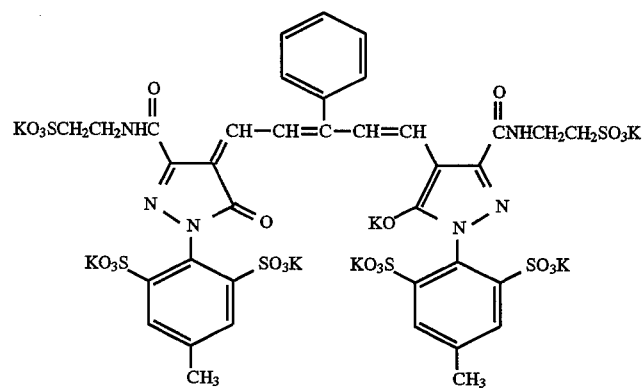
(10)
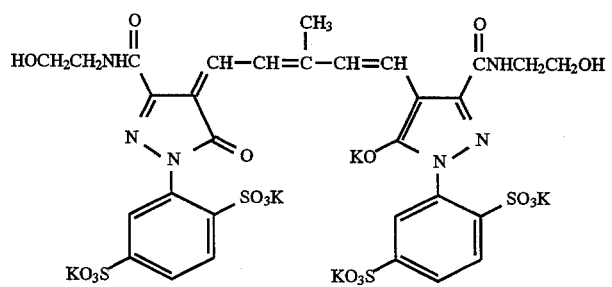
(11)
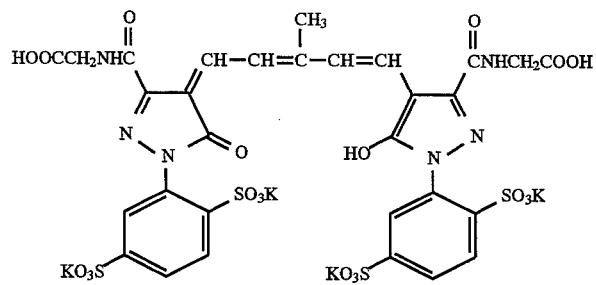
(12)

-continued
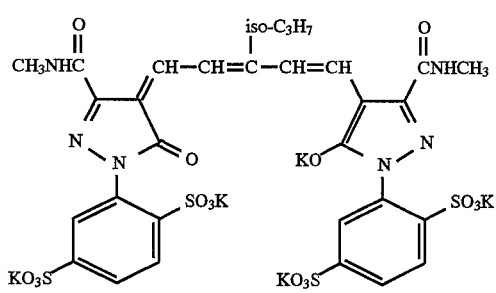
(13)
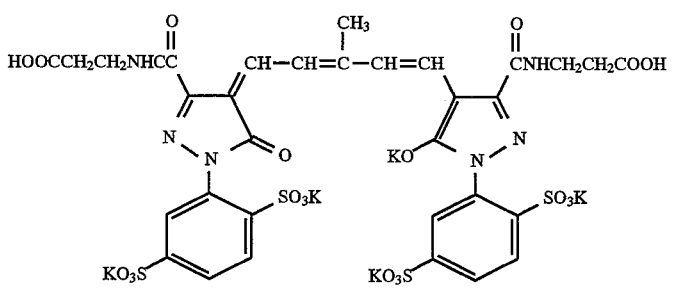
(14)
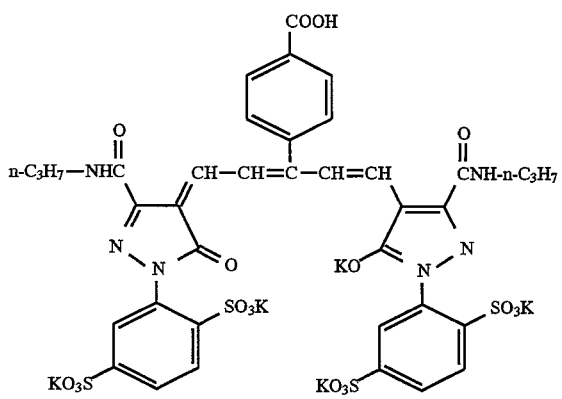
(15)
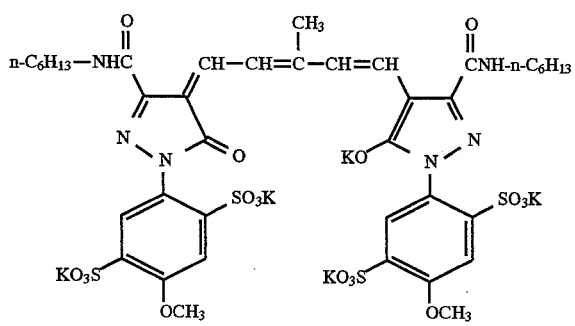
(16)
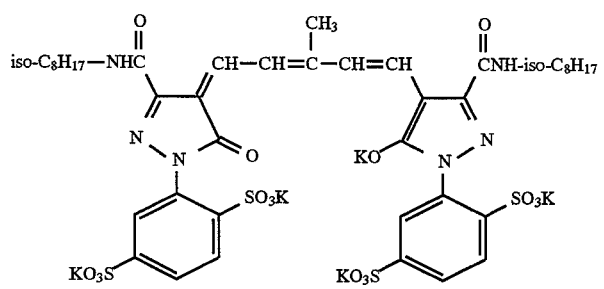
(17)

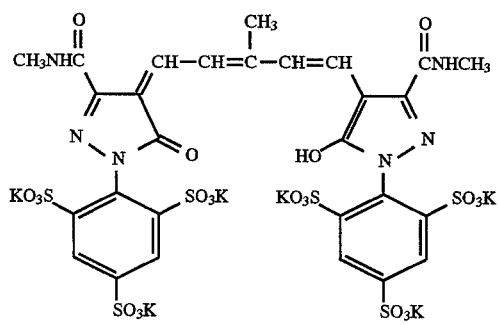 (18)
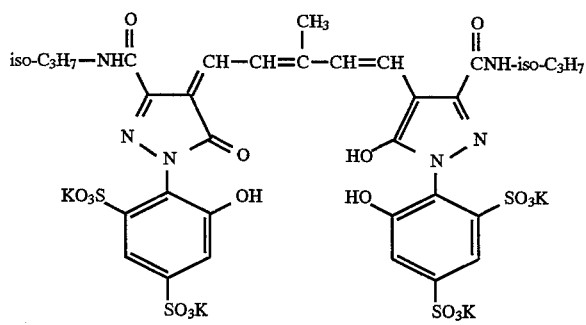 (19)
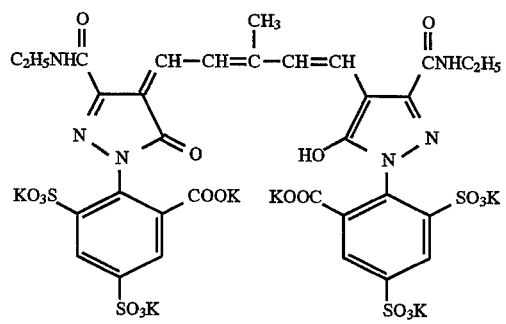 (20)
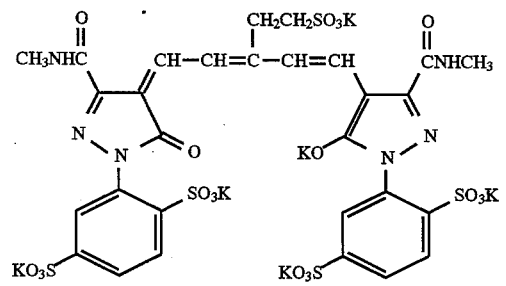 (21)
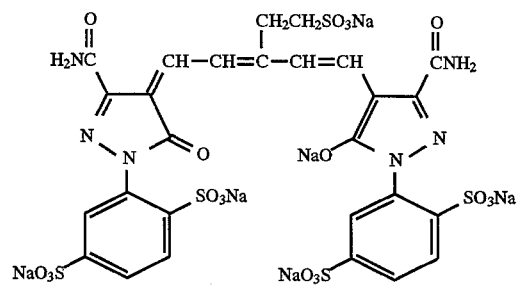 (22)

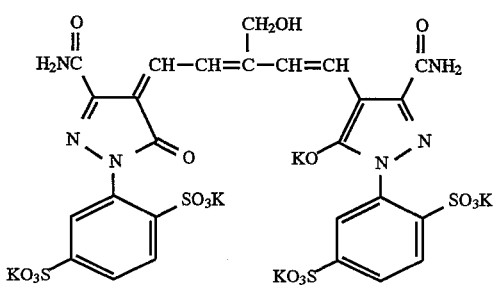
(23)
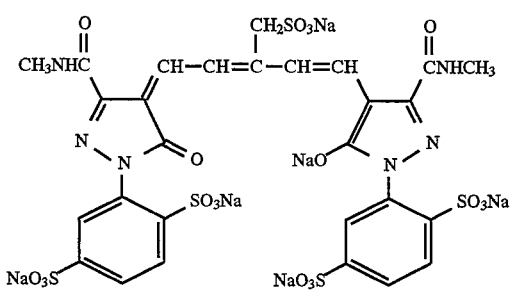
(24)
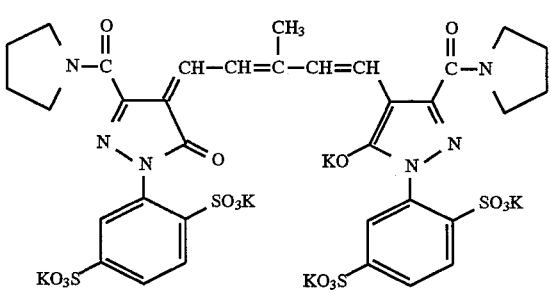
(25)
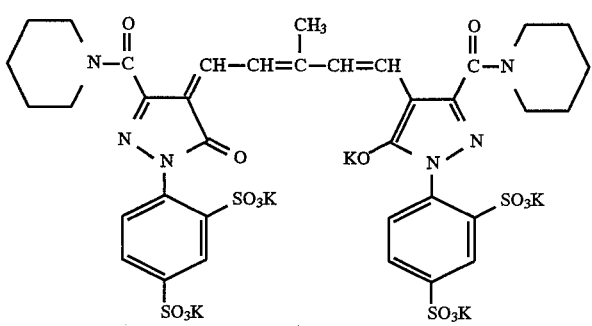
(26)
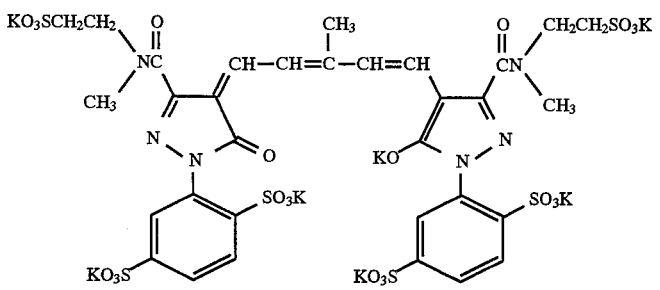
(27)

-continued

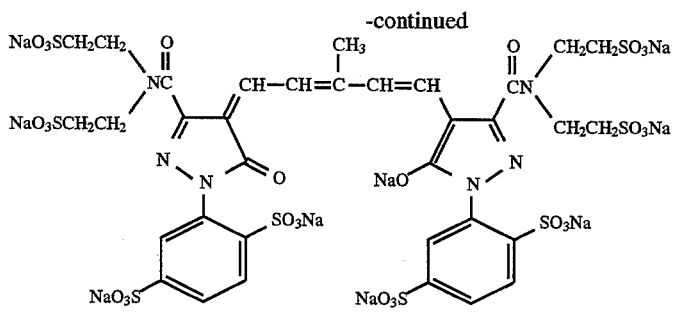

(28)

The compound of the present invention can be synthesized according to a combination of known chemical reactions. For example, the compound can be synthesized by the reaction of a 5-hydroxypyrazole compound (A) with a mesoposition substituted glutaconaldehydodianil compound (B).

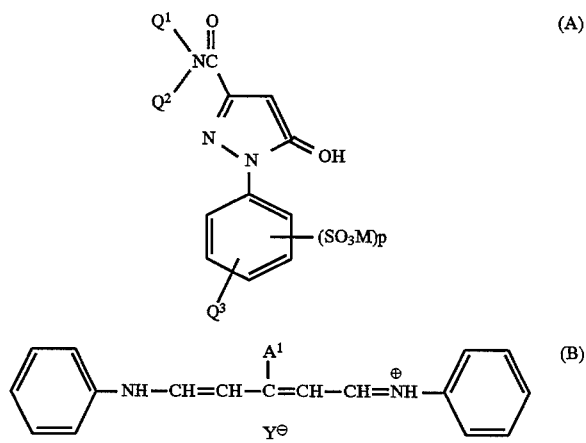

in which $A^1$, $Q^1$, $Q^2$, $Q^3$ and p have the same meanings as defined in the formula (I); M is hydrogen, an atomic group (e.g., ammonium) or a metal atom (e.g., sodium, potassium) that forms a cation; and Y is an atom (e.g., chlorine, bromine, iodine) or an atomic group (e.g., perchlorate, p-toluenesulfonate) that forms an anion.

The reaction proceeds in the presence of metal ions corresponding to $M^1$ and $M^2$ in the formula (I). The reaction is preferably conducted in a solvent (e.g., methanol, ethanol, N,N-dimethylformamide, N,N-dimethylacetamide, dimethylsulfoxide, water, a mixture thereof) in the presence of a base (e.g., pyridine, γ-picoline, triethylamine). If necessary, the compound can be further reacted with potassium acetate, sodium acetate or potassium iodide to form a salt.

The 3-carbamoyl-5-hydroxypyrazole compound (A) can be synthesized by a reaction of:

(a) directly reacting 5-hydroxypyrazole compound having carboxyl or an ester bond at 3-position with an amine or ammonia;

(b) reacting 3-carboxy-5-hydroxypyrazole compound with an amine in the presence of a condensing agent dicyclohexylcarbodiimide); or (c) converting carboxyl of 3-carboxy-5-hydroxypyrazole compound to or an acid halide or an acid anhydride, and reacting it with an amine.

If necessary, the enol group of the 5-hydroxypyrazole compound may be protected with a protective group according to a conventional method. After carbamoyl or a substituted carbamoyl group is formed at 3-position, the protective group is removed from the enol group. Using the protective group, the objective 5-hydroxypyrazole compound can be obtained in a high yield.

The meso-position substituted glutaconaldehydodianil compound (B) can be synthesized by a known method, which is described in Zhurnal Obshchei Khimii, volume 34, pages 1758 to 1771 (1964).

In the silver halide photographic material of the present invention, the dye represented by the formula (I) is contained in a silver halide emulsion layer or a non-lightsensitive hydrophilic colloidal layer. The dye in the layer is preferably in the form of molecular dispersion. The term "molecular dispersion" means that the compound is uniformly and finely dispersed in the layer, and that no solid particles are observed with a transparent electron microscope (TEM) having the magnification of 100,000.

The dye may be directly dispersed in the emulsion layer or the colloidal layer. A solution of the dye in a solvent may also be dispersed in the layers. Examples of the solvents include water, methanol, ethanol, propanol, a halogenated alcohol (disclosed in Japanese Patent Provisional Publication No. 48(1973)-9715 and U.S. Pat. No. 3,756,830), acetone, N,N-dimethylformamide, pyridine and a mixture thereof. Water, methanol and water-methanol mixture are preferred.

The amount of the dye is preferably so adjusted that the optical density is in the range of 0.05 to 3.0. The dye is contained in the silver halide emulsion layer or the hydrophilic colloidal layer preferably in the amount of 0.5 to 1,000 mg per $m^2$, and more preferably in the amount of 1 to 500 mg per $m^2$, and most preferably in the amount of 5 to 200 mg per $m^2$. The dye may be added to a layer at any stages of the formation of the layer.

The dye preferably functions as an antiirradiation dye. The antiirradiation dye is preferably added to the silver halide emulsion layer and the non-light-sensitive hydrophilic colloidal layer. The hydrophilic colloid in the emulsion layer and the colloidal layer usually is gelatin. The other known photographic colloids can also be used.

In the case that the support is a reflective support, the photographic material has an absorption maximum of a reflection spectrum in the range of 680 to 720 nm. The absorption maximum can be easily adjusted by using the dye of the present invention.

The present invention is applied to various silver halide photographic materials. The invention is particularly effective in a photographic material having a reflective support. For example, a color photographic material comprises a reflective support, a yellow color forming silver halide emulsion layer, a magenta color forming silver halide emulsion layer and a cyan color forming silver halide emulsion layer.

A conventional color paper contains color couplers according to a subtractive color process. In more detail, the color coupler forms a complementary color to the spectral sensitivity of the silver halide emulsion. The color paper usually comprises a reflective support, a blue sensitive emulsion layer containing a yellow coupler, a green sensitive emulsion layer containing a magenta coupler and a red sensitive emulsion layer containing a cyan coupler in the order. A reversal color paper usually comprises a reflective support, a red sensitive emulsion layer containing a cyan coupler, a green sensitive emulsion layer containing a magenta coupler and a blue sensitive emulsion layer containing a yellow coupler. The other orders can be used in the color paper. For example, an emulsion layer containing relatively large silver halide grains may be arranged as an upper layer to accelerate the development process. Further, a magenta color forming layer may be arranged as the lowermost layer to improve the stability of color to light. A false color photographic material can also be prepared by changing the above-mentioned relation between the spectral sensitivity of the emulsion and the hue of the color coupler. Further, an infrared sensitive emulsion layer can be provided in the photographic material. Two or more emulsion layers having the same spectral sensitivity can be provided in the photographic material.

Various non-light-sensitive hydrophilic colloidal layer may be provided between the support and the lowermost emulsion layer, between the emulsion layer or on the uppermost emulsion layer. The hydrophilic colloidal layers function as a color stain inhibiting layer, an antiirradiation layer, an antihalation layer, a light filter layer or a protective layer.

A black and white photographic paper comprises a support and a silver halide emulsion layer. The emulsion layer is sensitized as a panchromatic or orthochromatic emulsion, or is not sensitized. The black and white photographic paper usually further has a non-light-sensitive hydrophilic colloidal layer.

The silver halide emulsion layer contains silver chloride, silver bromide, silver chlorobromide, silver iodobromide, silver iodochloride or silver chloroiodobromide in the form of grains. A silver chloride, chlorobromide or chloroiodobromide emulsion is preferably used to accelerate the development process or to improve the handling the photographic material. The grains of the emulsion more preferably contain silver chloride in an amount of 95 mol % or more. A silver chloride or chlorobromide emulsion containing essentially no silver iodide is further preferred to accelerate the development process. The term "contain essentially no silver iodide" means that the silver iodide content is not more than 1 mol %, and preferably is not more than 0.2 mol %. On the other hand, a small amount (0.01 to 3 mol %) of silver iodide may be contained in the surface of silver high chloride grains (described in Japanese Patent Provisional Publication No. 3(1991)-84545) to improve the sensitivity to light of high intensity, the spectral sensitivity and the stability of the photographic material. Though the halide compositions in the grains may be different from each other, the grains preferably have the same halide compositions to obtain uniform grains easily. The halide distribution in the grain may be homogeneous or heterogeneous. The grains having the heterogeneous halide distribution include a layered grain and a non-layered grain. The layered grain has a structure consisting of a core and a shell. The shell may consist of two or more layers. The non-layered grain has a phase of a different halide composition attached to or contained in the grain. The phase may be attached to the surface of the grain such as edge, corner or face of the grain. The heterogeneous grains are preferred to the homogeneous grains because it is advantageous to increase the sensitivity of the heterogeneous grains. The heterogeneous grains are also advantageously used to improve the resistance to pressure. The heterogeneous grains may have a clear interface between the different halide compositions. The interface may also be vague because of mixed crystals formed by the difference of the halide composition. Further, the halide composition may be gradually changed in the grains.

In a high chloride emulsion, a localized phase of silver bromide is layered on, attached to or contained in silver chloride grains. The localized phase has a silver bromide content preferably of more than 10 mol %, and more preferably of more than 20 mol %. The silver bromide content in the localized phase can be determined by a X-ray analysis (described in Japan Chemical Society, New Expenmental Chemistry Course, Volume 6, Structural Analysis, Maruzen). The localized phase may be contained in the grain, or attached to the edge, corner or face of the grain. An epitaxial phase is preferably grown at the corner of the grain.

The silver chloride content in the emulsion may be increased to reduce the amount of a replenisher of a developing solution. An almost pure silver chloride emulsion having a silver chloride content in the range of 98 to 100 mol % is preferably used.

The average grain size of the silver halide emulsion is preferably in the range of 0.1 to 2 μm. The grain size corresponds to a diameter of a circle that has the same area as the projected area of a grain.

With respect to a grain size distribution, a monodispersed emulsion is preferred. In more detail, the distribution coefficient (standard deviation of the grain size distribution per average grain size) is preferably not more than 20%, more preferably not more than 15%, and most preferably not more than 10%. Two or more monodispersed emulsions may be mixed and contained in a layer to obtain a broad latitude. Two or more layers containing monodispersed emulsions may also be simultaneously formed to obtain the broad latitude.

The silver halide grain has a regular (e.g., cubic, tetradecahedral, octahedral) shape, an irregular (e.g., spherical, tabular) shape or a mixed shape thereof. Two or more grains having different shapes can be used in combination. The emulsion contains grains of a regular shape preferably of not less than 50%, more preferably of not less than 70%, and most preferably not less than 90%.

Tabular silver halide grains may also be preferably used. The tabular grains preferably have an average aspect ratio (diameter of corresponding circle per thickness) preferably of not less than 5, and more preferably of not less than 8. The tabular grains are preferably contained in the emulsion in an amount of more than 50% based on the projected areas of the grains.

A silver chloride (chlorobromide) emulsion can be prepared according to a conventional method, which is described in P. Glafkides, Chimie et Phisique Photographique (Paul Montel, 1967), G. F. Duffin, Photographic Emulsion Chemistry (Focal Press, 1966) and V. L. Zelikman et al., Making and Coating Photographic Emulsion (Focal Press, 1964). The grains can be formed by an acid process, a neutral process or an ammonia process. A soluble silver salt is mixed with a soluble halide salt by a single mixing method, a simultaneous mixing method or a combination thereof. The grains may be formed in the presence of excess silver ions according to a reversal mixing method. The simultaneous mixing method include a controlled double jet method, in which a liquid phase of forming silver halide is controlled at a constant pAg. A monodispersed emulsion containing regular crystals can be formed according to the controlled double jet method.

The localized phase or the basis of the grain may contain a hetero metal ion or a complex ion thereof. Preferred metals for the ions or the complex ions are included in the group VIII or the group IIb in the periodic table. Further, lead ion and thallium ion can be used. The localized phase preferably contains iridium ion, rhodium ion, iron ion or a complex ion thereof. The basis of the grain preferably contains osmium ion, iridium ion, rhodium ion, platinum ion, ruthenium ion, palladium ion, cobalt ion, nickel ion, iron ion or a complex ion thereof. The localized phase and the basis of the grain may contain different ions in the different amounts. Two or more metals can be used in combination. An iron compound or an iridium compound is preferably contained in localized phase of silver bromide.

A compound donating a metal ion can be added to an aqueous solution of gelatin (dispersing medium), an aqueous halide solution, an aqueous silver salt solution or another aqueous solution at the stage of grain formation to be incorporated into the localized phase or the basis of the grain. The compound may also be contained in fine silver halide grains, and the ion may be incorporated into grains by dissolving the fine grains.

The metal ion can also be added to the grains of the emulsion before or immediately after the stage of grain formation. The stage of addition can be changed according to the location of the ion in the grain.

A silver halide emulsion is usually chemically sensitized and spectrally sensitized.

The chemical sensitizations include a chalcogen sensitization, a noble metal sensitization and a reducing sensitization. The chalcogen sensitizations include a sulfur sensitization using a labile sulfur compound, a selenium sensitization using a selenium compound and a tellurium sensitization using a tellurium compound. A gold sensitization is usually used as the noble metal sensitization. Two or more sensitizations can be used in combination. The chemical sensitizers are described in Japanese Patent Provisional Publication No. 62(1987)-215272 on page 18, right lower column to page 22, right upper column.

A high chloride emulsion is preferably subjected to a gold sensitization.

A silver halide emulsion usually is a surface latent image type emulsion, in which a latent image is mainly formed on the surface of the grains.

Various compounds or precursors thereof can be added to a silver halide emulsion to prevent fog or to stabilize the photographic property of the emulsion at the stage of preparation, storage or processing of the photographic material. Examples of the compounds are described in Japanese Patent Provisional Publication No. 62(1987)-215272 on pages 39 to 72. Further, a 5-arylamino-1,2,3,4-thiatriazole compound (in which at least one electron attractive group is attached to the aryl group) is preferably used. The thiatriazole compound is described in European Patent No. 0447647.

A spectral sensitization is conducted to adjust the spectral sensitivity of an emulsion layer within a required wavelength region of light.

The spectral sensitizing dyes within blue, green or red regions are described in F. M. Hamer, Heterocyclic compounds-Cyanine dyes and related compounds (John Wiley & Sons, New York, London, 1964). Examples of the dyes and the spectral sensitizing methods are described in Japanese Patent Provisional Publications No. 62(1987)-215272 on page 22, light upper column to page 38.

Infrared sensitizing dyes are described in Japanese Patent Provisional Publications No. 3(1991)-15049 on page 12, left upper column to page 21, left lower column, No. 3(1991)-20730 on page 4, left lower column to page 15, left lower column, European Patents No. 0,420,011 on page 4, line 21 to page 6, line 54, No. 0,420,012 on page 4, line 12 to page 10, line 33, No. 0,443,466 and U.S. Pat. No. 4,975,362.

The spectral sensitizing dyes can be directly added to a silver halide emulsion. Further, a solution of the dye in a solvent can be added to the emulsion. Examples of the solvents include water, methanol, ethanol, propanol, methylcellosolve and 2,2,3,3-tetrafluoropropanol. Two or more solvents can be used in combination. An aqueous solution of the dye can be prepared in the presence of an acid or a base, as is described in Japanese Patent Publications No. 44(1969)-23389, No. 44(1969)-27555 and No. 57(1962)-22089. An aqueous solution or colloidal dispersion of the dye prepared in the presence of a surface active agent can be added to the emulsion, as is described in U.S. Pat. No. 3,822,135 and U.S. Pat. No. 4,006,025. A solution of the dye in a solvent (e.g., phenoxyethanol) that is not miscible with water can be dispersed in water or a hydrophilic colloid to be added to the emulsion. The dye directly dispersed in a hydrophilic colloid can be added to the emulsion, as is described in Japanese Patent Provisional Publications No. 53(1978)-102733 and No. 58(1983)-105141.

The sensitizing dye can be added to the emulsion at any stages, namely before, on or after the grain formation, before cooling the emulsion to set the gel, or at the preparation of the coating solution. The spectral sensitization is usually conducted after completing the chemical sensitization and before coating the emulsion. The spectral sensitization can be conducted simultaneously with the chemical sensitization by adding the sensitizing dye with a chemical sensitizer, as is described in U.S. Pat. No. 3,628,969 and U.S. Pat. No. 4,225,666. The spectral sensitization can be conducted before the chemical sensitization, as is described in Japanese Patent Provisional Publication No. 58(1983)-113928. The sensitizing dye can be added before completing the precipitation of silver halide grains to initiate the spectral sensitization. Two or more sensitizing dyes can be separately added to the emulsion, as is described in U.S. Pat. No. 4,225,666. In more detail, a part of the sensitizing dye is added to the emulsion before the chemical sensitization and the other is added after the chemical sensitization. The other addition methods are described in U.S. Pat. No. 4,183,756. The sensitizing dye is more preferably added after the chemical sensitization and before washing the emulsion with water.

The amount of the spectral sensitizing dye is preferably in the range of $0.5 \times 10^{-6}$ to $1.0 \times 10^{-2}$ mol, more preferably ably in the range of $1.0 \times 10^{-6}$ to $5.0 \times 10^{-3}$ mol based on 1 mol of silver halide.

A red or infrared sensitizing dye is used preferably in combination with a compound disclosed in Japanese Patent Provisional Publication No. 2(1990)-157749 on page 13, right lower column to page 22, right lower column. The disclosed compound has a specific function of improving the storage stability of the photographic material and the stability of the material in a processing solution and improving the supersensitizing effect. The compounds represented by the formulas (IV), (V) and (VI) in Japanese Patent Provisional Publication No. 2(1990)-157749 are particularly preferred. The amount of the compound is preferably in the range of $0.5 \times 10^{-5}$ mol to $5.0 \times 10^{-2}$ mol, more preferably in the range of $5.0 \times 10^{-5}$ mol to $5.0 \times 10^{-3}$ mol based on 1 mol of silver halide. The amount is also preferably in the range of 0.1 to 10,000 times, and more preferably in the range of 0.5 to 5,000 times based on the amount of the spectral sensitizing dye.

A preferred red sensitizing dye is represented by the formula (III):

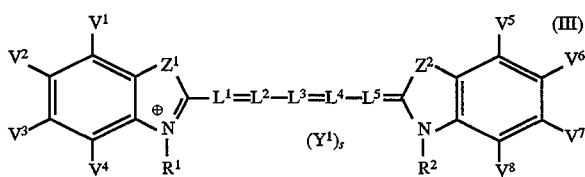

In the formula (III), $Z^1$ is oxygen, sulfur or selenium. Sulfur is preferred.

In the formula (III), $Z^2$ is oxygen, sulfur or selenium. Oxygen and sulfur are preferred.

In the formula (III) each of $L^1$, $L^2$, $L^3$, $L^4$ and $L^5$ independently is methine or a substituted methine group. The substituent groups of the substituted methine groups include an alkyl group (e.g., methyl, ethyl), a substituted alkyl group, an aryl group (e.g., phenyl), a substituted aryl group and a halogen atom (e.g., chlorine, bromine).

Two of $L^1$, $L^2$, $L^3$, $L^4$ and $L^5$ are combined with each other to form a five or six-membered ring. $L^2$ and $L^4$ are preferably combined to form a six-membered ring.

In the formula (III), each of $R^1$ and $R^2$ independently is an alkyl group or a substituted alkyl group.

The alkyl group preferably has 1 to 18 carbon atoms. Examples of the alkyl groups include methyl, ethyl, propyl, butyl, pentyl, octyl, decyl, dodecyl and octadecyl.

The alkyl moiety of the substituted alkyl group is the same as the above-mentioned alkyl group. Examples of the substituent groups include carboxy, sulfo, cyano, a halogen atom (e.g., fluorine, chlorine, bromine), hydroxy, an alkoxycarbonyl group having 2 to 8 carbon atoms (e.g., methoxycarbonyl, ethoxycarbonyl, phenoxycarbonyl, benzyloxycarbonyl), an alkoxy group having 1 to 8 carbon atoms (e.g., methoxy, ethoxy, benzyloxy, phenethyloxy), a monocyclic aryloxy group having 6 to 10 carbon atoms (e.g., phenoxy, tolyloxy), an acyloxy group having 2 to 8 carbon atoms (e.g., acetyloxy, propionyloxy), an acyl group having 2 to 8 carbon atoms (e.g., acetyl, propionyl, benzoyl, mesyl), a carbamoyl group having 1 to 8 carbon atoms (e.g., carbamoyl, N,N-dimethylcarbamoyl, morpholinocarbonyl, piperidinocarbonyl), a sulfamoyl group having 0 to 8 carbon atoms (e.g., sulfamoyl, N,N-dimethylsulfamoyl, morpholinosulfonyl, piperidinosulfonyl), an aryl group having 6 to 10 carbon atoms (e.g., phenyl, 4-chloromethyl, 4-methylphenyl, α-naphthyl).

An alkyl group (e.g., methyl, ethyl) and a sulfoalkyl group (e.g., 2-sulfoethyl, 3-sulfopropyl, 4-sulfobutyl) are preferred.

$R^1$ and $L^1$ or $R^2$ and $L^5$ may be combined with each other to form a five or six-membered ring.

In the formula (III), each of $V^1$, $V^2$, $V^3$, $V^4$, $V^5$, $V^6$, $V^7$ and $V^8$ independently is hydrogen, a halogen atom (e.g., fluorine, chlorine, bromine), an alkyl group, an acyl group, an acyloxy group, an alkoxycarbonyl group, a carbamoyl group, sulfamoyl group, carboxyl, cyano, hydroxy, amino, an amido group, an alkoxy group, an alkylthio group, an alkylsulfonyl group, sulfo, an aryloxy group or an aryl group.

The alkyl group preferably has 1 to 18 carbon atoms, more preferably has 1 to 10 carbon atoms. Examples of the alkyl group include methyl and ethyl. The alkyl group may have a substituent group. Examples of the substituted alkyl groups include benzyl, α-naphthylmethyl, 2-phenethyl and trifluoromethyl.

The acyl group preferably has 2 to 10 carbon atoms. Examples of the acyl groups include acetyl, benzoyl and mesyl.

The acyloxy group preferably has 2 to 10 carbon atoms. An example of the acyloxy group is acetyloxy.

The alkoxycarbonyl group preferably has 2 to 10 carbon atoms. Examples of the alkoxycarbonyl groups include methoxycarbonyl, ethoxycarbonyl and benzyloxycarbonyl.

The carbamoyl group may have a substituent group. The substituted carbamoyl group preferably has 2 to 10 carbon atoms. Examples of the substituted carbamoyl groups include N,N-dimethylcarbamoyl, morpholinocarbonyl and piperidinocarbonyl.

The sulfamoyl group may have a substituent group. The substituted sulfamoyl group preferably has 1 to 10 carbon atoms. Examples of the substituted sulfamoyl groups include N,N-dimethylsulfamoyl, morpholinosulfonyl, piperidinosulfonyl.

The amido group preferably has 2 to 8 carbon atoms. An example of the amido group is acetamido.

The alkoxy group preferably has 1 to 10 carbon atoms. Examples of the alkoxy groups include methoxy, ethoxy and benzyloxy.

The alkylthio group preferably has 1 to 10 carbon atoms. An example of the alkylthio group is ethylthio.

The alkylsulfonyl group preferably has 1 to 10 carbon atoms. An example of the alkylsulfonyl group is methylsulfonyl.

The aryloxy group preferably has 6 to 10 carbon atoms. An example of the aryloxy group is phenoxy.

The aryl group preferably has 6 to 10 carbon atoms. Examples of the aryl groups include phenyl and tolyl.

The neighboring two of $V^1$, $V^2$, $V^3$, $V^4$, $V^5$, $V^6$, $V^7$ and $V^8$ may combined with each other to form a ring condensed with the benzene ring. Examples of the rings include benzene, pyrrole, thiophene, furan, pyridine, imidazole, triazole and thiazole.

In the formula (III), $Y^1$ is a counter ion for the charge balance, and s is an integer required for the charge balance. The ionic charge of a coloring moiety or a substituent group in the compound determines whether $Y^1$ is a cation or an anion. The counter ion of $Y^1$ can be easily replaced with another ion after the synthesis of the dye. Examples of the cations include inorganic or organic ammonium ions and alkali metal ions. Various inorganic or organic anions can be used as $Y^1$. Examples of the anions include halide anion (e.g., fluoride, chloride, bromide, iodide), substituted arylsulfonate ions (e.g., p-toluenesulfonate, p-chlorobenzenesulfonate), aryldisulfonate ions (e.g., 1,3-benzenedisulfonate, 1,5-naphthalenedisulfonate, 2,6-naphthalenedisulfonate), alkylsulfate ions (e.g., methylsulfate), sulfonate ion, thiocyanate ion, perchlorate ion, tetrafluoroborate ion, picrate ion, acetate ion and trifluoromethanesulfonate ion. Preferred are p-toluenesulfonate ion and iodide ion.

A preferred red sensitizing dye is represented by the formula (IIIa):

In the formula (IIIa), $Z^3$ is oxygen or sulfur. Sulfur is preferred.

In the formula (IIIa), each of $L^6$ and $L^7$ independently is methine or a substituted methine group. Examples of the substituted methine groups are the same as those described in the formula (III).

In the formula (IIIa), each of $R^3$ and $R^4$ independently is an alkyl group or a substituted alkyl group, or $R^3$ and $L^6$ or $R^4$ and $L^7$ may be combined with each other to form a five or six-membered ring. Examples of $R^3$ and $R^4$ are the same as those described about $R^1$ and $R^2$ in the formula (III).

In the formula (IIIa), each of $V^9$, $V^{10}$, $V^{11}$, $V^{12}$, $V^{13}$, $V^{14}$, $V^{15}$ and $V^{16}$ independently is hydrogen, a halogen atom, an alkyl group, an acyl group, an acyloxy group, an alkoxycarbonyl group, a carbamoyl group, sulfamoyl group, carboxyl, cyano, hydroxy, amino, an amido group, an alkoxy group, an alkylthio group, an alkylsulfonyl group, sulfo, an aryloxy group or an aryl group. Hydrogen, an alkyl group having 1 to 6 carbon atoms (e.g., methyl, ethyl, n-propyl, isopropyl, n-butyl, tert-butyl, cyclopropyl, cyclobutyl, cyclohexyl), a substituted alkyl group having 1 to 8 carbon atoms ( e. g., carboxymethyl, 2-carboxyethyl, benzyl, phenethyl, dimethylaminopropyl), hydroxy, amino, a substituted amino group (e.g., hydroxyamino, methylamino, dimethylamino, diphenylamino ) , an alkoxy group (e.g., methoxy, ethoxy, propoxy, isopropoxy, butoxy), an aryloxy group (e.g., phenoxy) and an aryl group (e.g., phenyl) are preferred. Each of $V^9$, $V^{12}$, $V^{13}$ and $V^{16}$ more preferably is hydrogen. Each of $V^{10}$, $V^{11}$, $V^{14}$ and $V^{15}$ more preferably is hydrogen, methyl or methoxy.

Further, $V^9$, $V^{10}$, $V^{11}$, $V^{12}$, $V^{13}$, $V^{14}$, $V^{15}$ and $V^{16}$ have Hammett's values $\sigma_{p9}$ to $\sigma_{p16}$ satisfying $$\sum_{i=9}^{16} \sigma_{pi} \leq -0.08$$

when $Z^3$ is oxygen or $$\sum_{i=9}^{16} \sigma_{pi} \leq -0.15$$

when $Z^3$ is sulfur. When $Z^3$ is oxygen, the values preferably satisfy $$\sum_{i=9}^{16} \sigma_{pi} \leq -0.15,$$

and most preferably satisfy $$-0.90 \leq \sum_{i=9}^{16} \sigma_{pi} \leq -0.17.$$

when $Z^3$ is sulfur, the values preferably satisfy $$\sum_{i=9}^{16} \sigma_{pi} \leq -0.30,$$

and most preferably satisfy $$-1.05 \leq \sum_{i=9}^{16} \sigma_{pi} \leq -0.34.$$

The values of $\sigma_p$ are described in Chemical Reviews, volume 91, pages 168 to 175(1991). The values of $\sigma_p$ can be measured according to a method described in Chemical Reviews, volume 17, pages 125 to 136 (1935).

In the formula (IIIa), each of $R^5$ and $R^6$ independently is hydrogen, an alkyl group, a substituted alkyl group, an aryl group or a substituted aryl group. Hydrogen, methyl and phenyl are preferred. Methyl is more preferred.

In the formula (IIIa), $Y^2$ is a counter ion for the charge balance; and t is an integer required for the charge balance.

The sensitizing dye preferably has a reduction potential of $-1.285$ V (vs SCE) or less. The reduction potential can be measured by a second harmonics alternating current polarography of a phase separation type described in Journal of Imaging Science, volume 30, pages 27 to 35

Preferred sensitizing dyes are shown below.

| Dye | Z | $R^1$ | $R^2$ | $V^2$ | $V^3$ | $V^6$ | $V^7$ | $Y^1$ | s |
|---|---|---|---|---|---|---|---|---|---|
| S-1 | S | $CH_3CH_2$ | $CH_3CH_2$ | $CH_3$ | H | H | H | $I^-$ | 1 |
| S-2 | S | $CH_3CH_2$ | $CH_3CH_2$ | $CH_3$ | $CH_3$ | H | H | $I^-$ | 1 |
| S-3 | S | $CH_3CH_2$ | $CH_3CH_2$ | $CH_3$ | H | $CH_3$ | H | $I^-$ | 1 |
| S-4 | S | $CH_3CH_2$ | $CH_3CH_2$ | $CH_3$ | H | H | $CH_3$ | $I^-$ | 1 |
| S-5 | S | $CH_3CH_2$ | $CH_3CH_2$ | H | $CH_3$ | H | $CH_3$ | $I^-$ | 1 |
| S-6 | S | $CH_3CH_2$ | $CH_3CH_2$ | $CH_3O$ | H | H | H | $I^-$ | 1 |
| S-7 | S | $CH_3CH_2$ | $CH_3CH_2$ | H | H | H | H | $I^-$ | 1 |
| S-8 | S | $CH_3CH_2$ | $CH_3CH_2$ | $CH_3O$ | $CH_3O$ | H | H | $I^-$ | 1 |
| S-9 | S | $CH_3CH_2$ | $CH_3CH_2$ | $CH_3O$ | H | $CH_3O$ | H | $I^-$ | 1 |
| S-10 | S | $CH_3CH_2$ | $CH_3CH_2$ | $CH_3O$ | H | H | $CH_3O$ | $I^-$ | 1 |
| S-11 | S | $CH_3CH_2$ | $CH_3CH_2$ | H | $CH_3O$ | H | $CH_3O$ | $I^-$ | 1 |
| S-12 | S | $CH_3CH_2$ | $CH_3CH_2$ | $CH_3$ | $CH_3$ | $CH_3$ | $CH_3$ | $I^-$ | 1 |
| S-13 | S | $CH_3CH_2$ | $CH_3CH_2$ | $CH_3O$ | $CH_3O$ | $CH_3O$ | $CH_3O$ | $I^-$ | 1 |
| S-14 | S | $CH_3CH_2$ | $CH_3CH_2$ | $CH_3O$ | $CH_3$ | H | H | $I^-$ | 1 |
| S-15 | S | $CH_3CH_2$ | $CH_3CH_2$ | $C_2H_5O$ | H | $C_2H_5O$ | H | $I^-$ | 1 |
| S-16 | S | $CH_3CH_2$ | $CH_3CH_2$ | $C_2H_5$ | H | $C_2H_5$ | H | $I^-$ | 1 |
| S-17 | S | $CH_3CH_2$ | $CH_3CH_2$ | $n\text{-}C_3H_7$ | H | $n\text{-}C_3H_7$ | H | $I^-$ | 1 |
| S-18 | S | $CH_3CH_2$ | $CH_3CH_2$ | $N(CH_3)_2$ | H | H | H | $I^-$ | 1 |

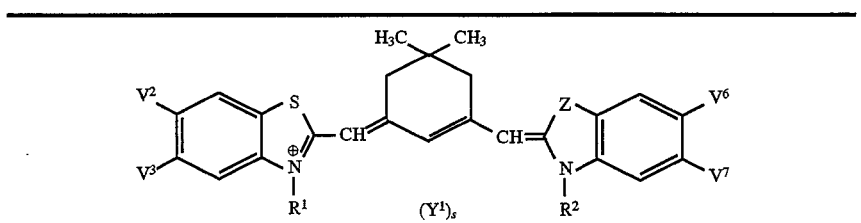

| | | | | | | | | |
|---|---|---|---|---|---|---|---|---|
| S-19 | S | (CH$_2$)$_3$SO$_3^-$ | CH$_3$CH$_2$ | CH$_3$ | H | CH$_3$ | H | — | — |
| S-20 | S | (CH$_2$)$_4$SO$_3^-$ | CH$_3$CH$_2$ | CH$_3$ | H | CH$_3$ | H | — | — |
| S-21 | S | (CH$_2$)$_3$SO$_3^-$ | (CH$_2$)$_3$SO$_3^-$ | CH$_3$ | H | CH$_3$ | H | HN$^+$Et$_2$ | 1 |
| S-22 | S | (CH$_2$)$_4$SO$_3^-$ | (CH$_2$)$_4$SO$_3^-$ | CH$_3$ | H | CH$_3$ | H | HN$^+$-pyridinium | 1 |
| S-23 | S | CH$_3$(CH$_2$)$_4$ | CH$_3$CH$_2$ | CH$_3$ | H | CH$_3$ | H | I$^-$ | 1 |
| S-24 | S | CH$_3$(CH$_2$)$_4$ | (CH$_2$)$_3$SO$_3^-$ | CH$_3$ | H | CH$_3$ | H | — | — |
| S-25 | S | CH$_3$ | CH$_3$ | CH$_3$ | H | CH$_3$ | H | I$^-$ | 1 |
| S-26 | S | (CH$_2$)$_3$SO$_3^-$ | (CH$_2$)$_4$SO$_3^-$ | CH$_3$ | H | CH$_3$ | H | HN$^+$Et$_2$ | 1 |
| S-27 | S | CH$_3$ | CH$_3$(CH$_2$)$_2$ | CH$_3$ | H | CH$_3$ | H | I$^-$ | 1 |
| S-28 | S | (CH$_2$)$_3$SO$_3^-$ | CH$_3$CH$_2$ | CH$_3$O | CH$_3$O | H | H | — | — |
| S-29 | S | CH$_3$CH$_2$ | (CH$_2$)$_3$SO$_3^-$ | CH$_3$O | CH$_3$O | H | H | — | — |
| S-30 | O | CH$_3$CH$_2$ | CH$_3$CH$_2$ | CH$_3$ | H | H | H | I$^-$ | 1 |
| S-31 | O | CH$_3$CH$_2$ | CH$_3$CH$_2$ | H | CH$_3$ | H | H | I$^-$ | 1 |
| S-32 | O | CH$_3$CH$_2$ | CH$_3$CH$_2$ | CH$_3$ | CH$_3$ | H | H | I$^-$ | 1 |
| S-33 | O | CH$_3$CH$_2$ | CH$_3$CH$_2$ | CH$_3$ | H | CH$_3$ | H | I$^-$ | 1 |
| S-34 | O | CH$_3$CH$_2$ | CH$_3$CH$_2$ | CH$_3$ | H | H | CH$_3$ | I$^-$ | 1 |
| S-35 | O | CH$_3$CH$_2$ | CH$_3$CH$_2$ | H | CH$_3$ | H | CH$_3$ | I$^-$ | 1 |

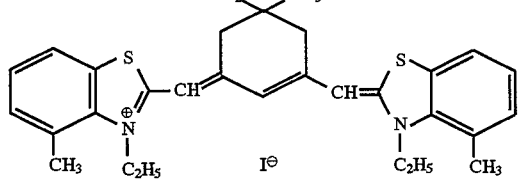

(S-36)

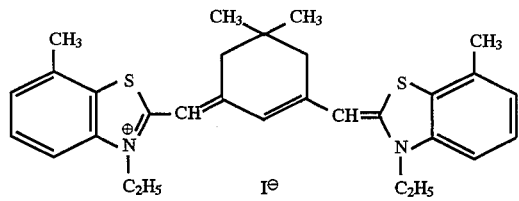

(S-37)

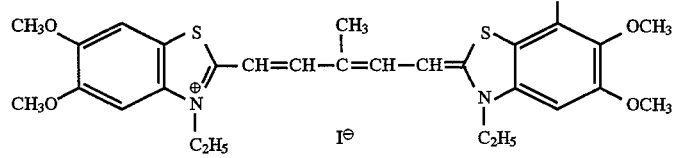

(S-38)

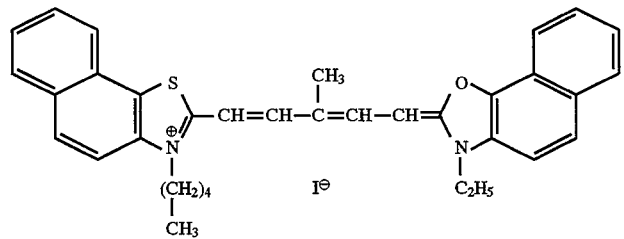

(S-39)

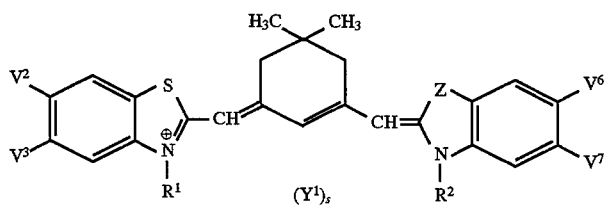
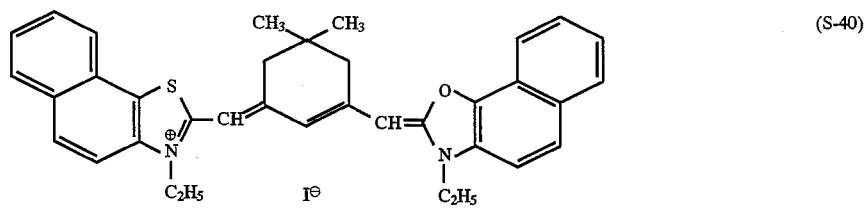
(S-40)
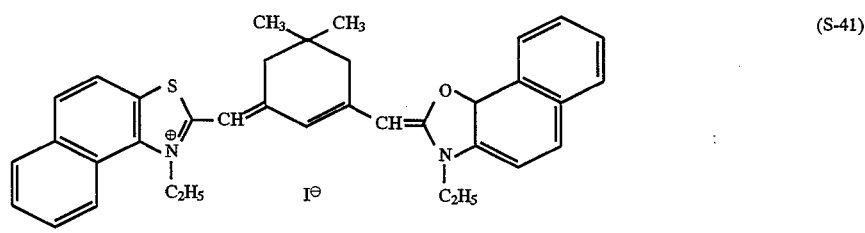
(S-41)
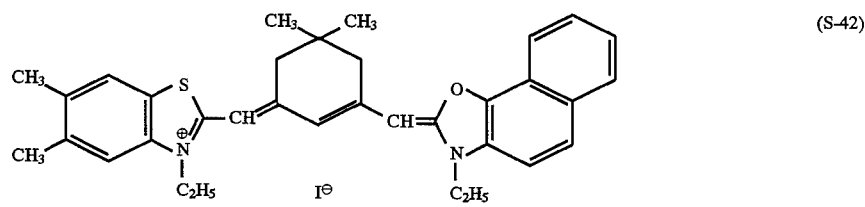
(S-42)
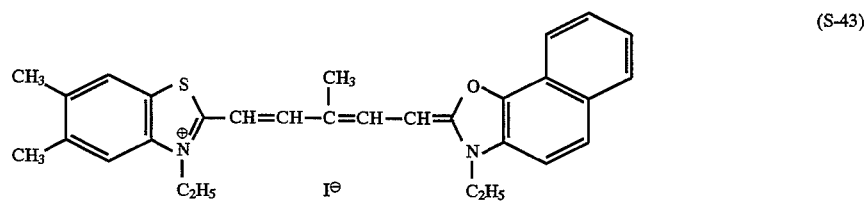
(S-43)
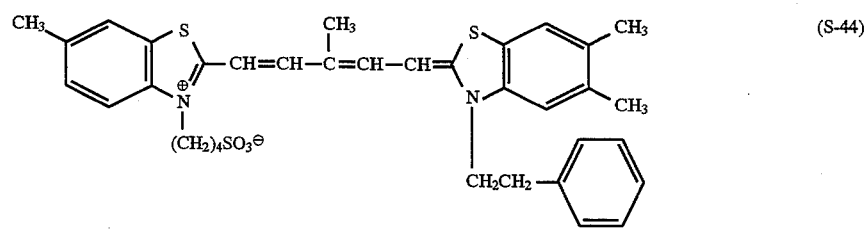
(S-44)

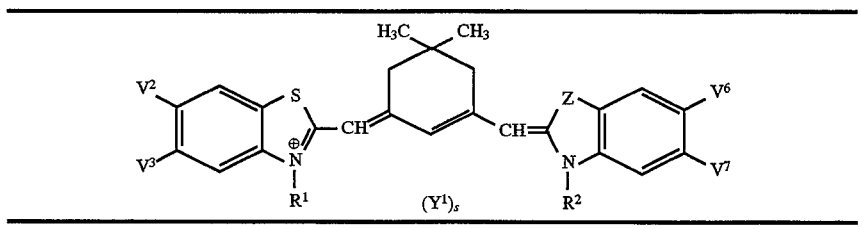

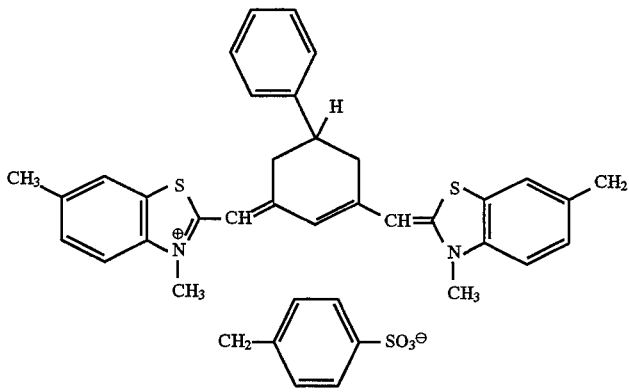

(S-45)

The spectral sensitizing dye represented by the formula (III) can be synthesized according to a known process, which is described in F. M. Hamer, Heterocyclic Compounds-Cyanine Dyes and Related Compounds, volume IX, pages 270 to 287, John Wiley and Sons (1964) and P. M. Sturmer, Heterocyclic Compounds-Special Topics in Heterocyclic Chemistry, volume VIII, section IV, pages 482 to 515, John Wiley and Sons (1977).

The amount of the sensitizing dye is preferably in the range of $4\times10^{-6}$ to $8\times10^{-3}$ mol, more preferably in the range of $1\times10^{-6}$ to $1\times10^{-3}$ mol, and most preferably in the range of $5\times10^{-5}$ to $5\times10^{-4}$ mol based on 1 mol of silver halide.

The photographic material of the present invention can be used in a digital scanning exposure system in addition to a conventional negative printing system. The digital scanning exposure uses a monochromatic light of a high density such as a gas laser, light emitting diode or semiconductor laser and a second high-frequency generating (SHG) light source using a combination of a solid laser with a nonlinear optical crystals. The solid laser uses a semiconductor laser as the excitation light source. A semiconductor laser is preferably used to construct a compact, inexpensive, long life and stable device. It is desired that at least one light source is the semiconductor laser.

The maximum spectral sensitivity of the photographic material can be optionally determined according to the wavelength of the scanning light source. A blue or green light can be emitted by obtaining half wavelength of laser oscillation where the light source is a solid laser using a semiconductor laser as the excitation source or a SHG light source using a combination of a semiconductor laser with a nonlinear optical crystals. Accordingly, the maximum spectral sensitivity can be adjusted within the conventional blue, green and red regions. At least two layers should have the maximum spectrally sensitivity of not shorter than 670 nm to construct a compact, inexpensive and stable device, since an available inexpensive and stable device uses a III-V groups semiconductor laser, which has a wavelength only within red and infrared regions. However, a laser oscillation within the green or blue region is expenmentally observed by using the III-V groups semiconductor laser. Therefore, an inexpensive and stable device using the green or blue laser might be available. If so, it might be not so important that at least two layers should have the maximum spectrally sensitivity of not shorter than 670 nm.

In the scanning exposure, the time required for exposing silver halide in a photographic material corresponds to the time required for exposing a minute area. The minute area usually is the minimum unit in which the exposure is controlled by the digital data. The minimum unit is the picture element. The exposure time for the picture element is changed according to the size of the element. The size of the picture element depends on the element density, which usually is in the range of 50 to 2,000 dpi. In the case that the element density is 400 dpi, the exposure time for the element size is preferably not longer than $10^{-4}$ second, and more preferably not longer than $10^{-6}$ second.

A hydrophilic colloidal layer may be colored to prevent halation or irradiation or to decrease the sensitivity to a safelight. The dye of the present invention can be used to color the colloidal layer. The dye can also be used to improve the resistance to the pressure. Other water soluble dyes can be used in combination with the dye of the invention. The other dyes are preferably decolored while processing the photographic material. Examples of the dyes include oxonol dyes and cyanine dyes. The dyes are described in European Patent Publication No. 0337490A2 on pages 27 to 76.

In the case that a large amount of a water soluble dye is used, the dye sometimes causes a color separation or increases the sensitivity to safelight. European Patent Publication No. 0539978A1, Japanese Patent Provisional Publications No. 5(1993)-127324 and No. 5(1993)-127325 disclose water soluble dyes, which do not cause the color separation. The dyes disclosed in the publications can be used in combination with the other dyes.

The water soluble dyes are diffused in a photographic material from the layer to which the dyes are added to the other layers. The colored density is preferably not smaller than 0.2, more preferably not smaller than 0.3, and most preferably not smaller than 0.5 at the maximum wave-length of light from a light source. In the case that the dye of the present invention is used, the colored density is also preferably not smaller than 0.3.

In the photographic material, a colored layer can be used in place of or in addition to the water soluble dye. The layer should be decolored while processing the photographic material. The colored layer may be directly provided on or under an emulsion layer. An intermediate layer may also be provided between the colored layer and the emulsion layer. The intermediate layer contains gelatin and a color stain inhibitor such as hydroquinone. A colored layer is preferably provided under an emulsion layer forming a color that has the same hue of the colored layer. Each of the colored layers may be provided under each of the emulsion layers forming primary colors. Further, a layer may have a mixed color corresponding to two or more colors of the emulsion layers. The optical reflection density of the colored layer preferably in the range of the 0.2 to 3.0, more preferably in the range of 0.5 to 2.5, and most preferably in the range of 0.8 to 2.0. The optical reflection density is measured at the wavelength forming the maximum density at the wavelength of the exposure. The wavelength of a conventional printing exposure is usually in the visible reason of 400 to 700 nm. The wavelength of the scanning exposure corresponds to the wavelength of the light source of the scanning exposure.

The colored layer can be formed according to a conventional process. Solid particles of a dye may be dispersed in a hydrophilic colloidal layer, as is described in Japanese Patent Provisional Publications No. 2(1990)-282244 on page 3, light upper column to page 8 and No. 3(1991)-7931 on page 3, right upper column to page 11, left lower column. An anionic mordant dye may be used with a cationic polymer. A dye may be adsorbed on particles (e.g., silver halide grains) and fixed in a layer. A colloidal silver may be used, as is described in Japanese Patent Provisional Publication No. 1(1989)-239544. In the case that solid fine particles of dyes are dispersed in a layer, the dye preferably is water insoluble at pH of 6 or less, and is water soluble at pH of 8 or more, as is described in Japanese Patent Provisional Publication No. 2(1990)-308244 on pages 4 to 13. The anionic mordant dye used with the cationic polymer is described in Japanese Patent Provisional Publication No. 2(1990)-84637 on pages 18 to 26. The colloidal silver functioning as a light absorbing agent can be prepared according to known processes described in U.S. Pat. No. 2,688,601 and U.S. Pat. No. 3,459,563. Tabular thin colloidal silver grains having the thickness of not more than 20 nm (disclosed in Japanese Patent Provisional Publication No. 5(1993)-13458) may also be used. The fine powder of the dye and the colloidal silver are preferably used.

Gelatin is advantageously used as the binder or the protective colloid of the photographic material. Other hydrophilic colloids can also be used in place of or in addition to gelatin. Gelatin has a calcium content preferably of not more than 800 ppm, more preferably of not more than 200 ppm. Anticeptics are preferably added to the hydrophilic colloidal layers to prevent molds and bacteria grown in the layers. The antiseptics are described in Japanese Patent Provisional Publication No. 63(1988)-271247.

A band stop filter is preferably used when a photographic material is subjected to a printing exposure, The band stop filter is described in U.S. Patent No. 4,880,726. The filter has a function of removing the light contamination and improving the color reproducibility remarkably.

The exposed photographic material is subjected to a conventional color developing process. After the color developing process, the photographic material is preferably subjected to a bleach-fix process for a rapid processing. In the case that a high chloride emulsion is used, the bleach fix solution is preferably adjusted at pH 6.5 or less, and more preferably at pH 6 or less to accelerate a reaction of removing silver.

The silver halide emulsions, the other materials (additives), the layers (including layered structures), processing methods and additives for the processing solutions are described in Japanese Patent Provisional Publications No. 62(1987)-215272, No. 2(1990)-33144 and European Patent Publication No. 0355660A2 (Japanese Patent Provisional Publication No. 2(1990)-139544).

In more detail, Japanese Patent Provisional Publications No. 62(1987)-215272 describes silver halide emulsions on page 10, right upper column, line 6 to page 12, left lower column, line 5 and on page 12, the forth line from the bottom of right lower column to page 13, left upper column, line 17; silver halide solvents on page 12, lest lower column, lines 6 to 14 and on page 13, the third line from the bottom of left upper column to page 18, the final line of left lower column; chemical sensitizers on page 12, the third line from the bottom of left lower column to the fifth line from the bottom of the right lower column and on page 18, right lower column, line 1 to page 22, the ninth line from the bottom of the right upper column; spectral sensitizers and spectral sensitizing methods on page 22, the eighth line from the bottom of right upper column to page 38, the final line; emulsion stabilizers on page 39, left upper column, line 1 to page 72, the final line of right upper column; development accelerators on page 72, left lower column, line 1 to page 91, right upper column, line 3; color (cyan, magenta, yellow) couplers on page 91, right upper column, line 4 to page 121, left upper column, line 6; color increasing agents on page 121, left upper column, line 7 to page 125, right upper column, line 1; ultraviolet absorbents on page 125, right upper column, line 2 to page 127, the final line of left lower column; color fading inhibitors (image stabilizers) on page 127, right lower column, line 1 to page 137, left lower column, line 8; high boiling or low boiling organic solvents on page 137, left lower column, line 9 to page 144, the final line of right upper column; dispersing methods of photographic additives on page 144, left lower column, line 1 to page 146, right upper column, line 7; hardening agents on page 146, right upper column, line 8 to page 155, left lower column, line 4; precursors of developing agents on page 155, left lower column, line 5 to page 155, right lower column, line 2; development inhibitor releasing compounds on page 155, right lower column, lines 3 to 9; layered structures on page 156, left upper column, line 15 to page 156, right lower column, line 14; dyes on page 156, right lower column, line 15 to page 184, the final line of right lower column; color stain inhibitors on page 185, left upper column, line 1 to page 188, right lower column, line 3; gradation adjusting agents on page 188, right lower column, lines 4 to 8; stain inhibitors on page 188, right lower column, line 9 to page 193, right lower column, line 10; surface active agents on page 201, left lower column, line 2 to page 210, the final line of right upper column; fluorine containing compounds (antistatic agents, coating aids, lubricating agents, antiadhesion agents) on page 210, left lower column, line 1 to page 222, left lower column, line 5; binders (hydrophilic colloids) on page 222, left lower column, line 6 to page 225, the final line of left upper column; viscosity increasing agents on page 225, right upper column, line 1 to page 227, right upper column, line 2; antistatic agents on page 227, right upper column line 3 to page 230, the final line of left upper column; polymer latex on page 230, left upper column, line to page 239, the final line; matting agents on page 240, left upper column line 1, to page 240, the final line of right upper column; and photographic processes (processing steps and additives) on page 3, right upper column, line 7 to page 10, right upper column, line 5. The descriptions of Japanese Patent Provisional Publications No. 62(1987)-215272 include the amendments filed on Mar. 16, 1987.

Japanese Patent Provisional Publication No. 2(1990)-33144 describes silver halide emulsions on page 28, right upper column, line 16 to page 29, right lower column, line 11 and on page 30, lines 2 to 5; chemical sensitizers on page 29, right lower column, line 12 to the final line; spectral sensitizers (spectral sensitizing methods) on page 30, left upper column lines 1 to 13; emulsion stabilizers on page 30, left upper column, line 14 to right upper column, line 1; color (cyan, magenta, yellow) couplers on page 3, right upper column, line 14 to page 18, the final line of left upper column and on page 30, right upper column, line 6 to page 35, right lower column, line 11; ultraviolet absorbents on page 37, right lower column, line 14 to page 38, left upper column, line 11; color fading inhibitors (image stabilizers) on page 36, right upper column, line 12 to page 37, left upper column, line 19; high boiling or low boiling solvents on page 35, right lower column, line 14 to page 36, the fourth line from the bottom of left upper column; dispersing methods of photographic additives on page 27, right lower column, line 10 to page 28, the final line of left upper column and on page 35, right lower column, line 12 to page 36, right upper column, line 7; layered structures on page 28, right upper column lines 1 to 15; dyes on page 38, left upper column, line 12 to right upper column, line 7; color stain inhibitors on page 36, right upper column, lines 8 to 11; stain inhibitors on page 37, the final line of left upper column to right lower column, line 13; surface active agents on page 18, right upper column, line 1 to page 24, the final line of right lower column and on page 27, the tenth line from the bottom of left lower column to right lower column, line 9; fluorine containing compounds (antistatic agents, coating aids, lubricating agents, antiadhesion agents) on page 25, left upper column, line 1 to page 27, right lower column, line 9; binders (hydrophilic colloids) on page 38, right upper column, lines 8 to 18; and photographic processes (processing steps and additives) on page 39, left upper column, line 4 to page 42, the final line of left upper column.

European Patent Publication No. 0355660A2 describes silver halide emulsions on page 45, line 53 to page 47, line 3 and on page 47, lines 20 to 22; chemical sensitizers on page 47, lines 4 to 9; spectral sensitizers (spectral sensitizing methods) on page 47, lines 10 to 15; emulsion stabilizers on page 47, lines 16 to 19; color (cyan, magenta, yellow) couplers on page 4, lines 15 to 27, on page 5, line 30 to the final line of page 28, on page 45, lines 29 to 31 and on page 47, line 23 to page 63, line 50; ultraviolet absorbents on page 65, lines 22 to 31; color fading inhibitors (image stabilizers) on page 4, line 30 to page 5, line 23, on page 29, line 1 to page 45, line 25, on page 45, lines 33 to 40 and on page 65, lines 2 to 21; high boiling or low boiling organic solvents on page 64, lines 1 to 51; dispersing methods of photographic additives on page 63, line 51 to page 64, line 56; layered structures on page 45, lines 41 to 52; dyes on page 66, lines 18 to 22; color stain inhibitors on page 64, line 57 to page 65, line 1; stain inhibitors on page 65, line 32 to page 66, line 17; binders (hydrophilic colloids) on page 66, lines 23 to 28; and photographic processes (processing steps and additives) on page 67, line 14 to page 69, line 28.

The yellow coupler preferably is of a short wavelength type. The short wavelength type yellow coupler is described in Japanese Patent Provisional Publications No. 6391988)-231451, No. 63(1988)-1232047, No. 63(1988)-241547, No. 1(1989)-173499, No. 1(1989)213648 and No. 1(1989)-250944.

The cyan, magenta or yellow couplers are preferably emulsified or dispersed in an aqueous solution of a hydrophilic colloid using a polymer. For examples, a latex polymer (disclosed in U.S. Pat. No. 4,203,716) may be impregnated with the coupler. Further, the coupler may be dissolved with a water insoluble and organic solvent soluble polymer. A high boiling organic solvent may be used in the emulsifying or dispersing process.

The water insoluble and organic solvent soluble polymers are described in U.S. Pat. No. 4,857,449 at columns 7 to 15 and International Patent Publication No. 88/00723 on pages 12 to 30. Methacrylate or acrylamide polymers are preferred. Acrylamide polymers are more preferably used to stabilize a color image.

A color image stabilizing compound (disclosed in European Patent Publication No. 0277589A2) is preferably used in combination with a coupler (particularly, pyrazoloazole coupler or pyrrolotriazole coupler).

The stabilizing compounds react with a remaining aromatic amine color developing agent or an oxidation product of the developing agent after the color developing process. After the reaction, a chemically inactive and substantially colorless compound may be formed by the agent. Therefore, the stabilizing compound has a function of inhibiting color stains or other problems caused by the remaining developing agent or the oxidation product.

Examples of cyan couplers include diphenylimidazole couplers (described in Japanese Patent Provisional Publication No. 2(1990)-33144), 3-hydroxypyridine couplers (described in European Patent Publication No. 0333185A2), cyclic active methylene couplers (described in Japanese Patent Provisional Publication No. 64(1989)-32260), pyrrolopyrazole couplers (described in European Patent Publication No. 0456226A1), pyrroloimidazole couplers (described in European Patent Publication No. 0484909), pyrrolotriazole couplers (described in European Patent Publications No. 0488248 and 0491197A1). With respect to the 3-hydroxypyridine couplers, two equivalents couplers formed by adding chloride releasing groups to four equivalents couplers of example No. 42 described in European Patent Publication No. 0333185A2. Examples No. 6 and No. 9 described in European Patent Publication No. 0333185A2 are also preferred. With respect to the cyclic active methylene couplers, examples No. 3, No. 8 and No. 34 described in Japanese Patent Provisional Publication No. 64(1989)-32260 are preferred. Pyrrolotriazole cyan couplers are particularly preferred.

Examples of yellow couplers include acylacetamide couplers in which the acyl group has 3 to five-membered cyclic structure (described in European Patent Publication No. 0447969A1), cyclic malonodiaminide couplers (described in European Patent Publication No. 0482552A1) and acylacetamide coupler having dioxane structure (described in U.S. Pat. No. 5,118,599). With respect to the acylacetamide coupler, the acyl group preferably is 1-alkylcyclopropane-1-carbonyl. With respect to the malonodianilide coupler, one anilide preferably forms indoline ring. Two or more yellow couplers may be used in combination.

Preferred magenta couplers are 5-pyrazolone couplers and pyrazoloazole couplers. The magenta coupler represented by the formula (II) is particularly preferred. The coupler represented formula (II) is excellent in hue, image stability, coloring property and processing property.

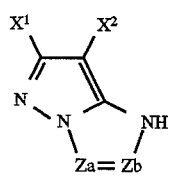 (II)

In the formula (II), $X^1$ is hydrogen or a substituent group, $X^2$ is hydrogen or a substituent group that can be released by a coupling reaction, each of Za and Zb independently is —C($X^3$)= or —N=, and $X^3$ is hydrogen or a substituent group.

Two or more compounds represented by the formula (II) may be combined at the group of $X^1$, $X^2$ or $X^3$ to form an oligomer or a polymer. The polymer coupler may be homopolymer of the monomers represented by the formula (II). A copolymer may also be formed by the monomers with another monomer such as a non-coloring ethylenic monomer, which does not cause a coupling reaction with an oxidation product of an aromatic pnmary amine developing agent.

In the formula (II), Za preferably is —N=, and Zb preferably is —C($X^3$)=.

In the formula (II), examples of the substituent groups represented by $X^1$ and $X^3$ include an alkyl group, a cycloalkyl group, an alkenyl group, an aryl group, a heterocyclic group, cyano, a halogen atom (e.g., fluorine, chlorine, bromine), hydroxyl, nitro, carboxyl, an alkoxy group, a cycloalkoxy group, an aryloxy group, a heterocyclicoxy group, a silyloxy group, an acyloxy group, an alkoxycarbonyloxy group, a cycloalkoxycarbonyloxy group, an aryloxycarbonyloxy group, a carbamoyloxy group, a sulfamoyloxy group, an alkanesulfonyloxy group, an arenesulfonyloxy group, an acyl group, an alkoxycarbonyl group, a cycloalkoxycarbonyl group, an aryloxycarbonyl group, a carbamoyl group, an amino group, an anilino group, a heterocyclicamino group, a carbonamido group, an ureido group, an imido group, an alkoxycarbonylamino group, an aryloxycarbonylamino group, a sulfonamide group, a sulfamoylamino group, an azo group, an alkylthio group, an arylthio group, a heterocyclicthio group, an alkylsulfinyl group, an arenesulfinyl group, an alkanesulfonyl group, an arenesulfonyl group, a sulfamoyl group, sulfo and a phosphonyl group.

The alkyl group preferably has 1 to 32 carbon atoms. The alkyl group has a straight or branched chain structure. Examples of the alkyl groups include methyl, ethyl, propyl, isopropyl, butyl, tert-butyl, 1-octyl, tridecyl.

The cycloalkyl group preferably has 3 to 32 carbon atoms. Examples of the cycloalkyl groups include cyclopropyl, cyclopentyl and cyclohexyl.

The alkenyl group preferably has 2 to 32 carbon atoms. Examples of the alkenyl groups include vinyl, allyl, 3-butene-1-yl.

The aryl group preferably has 6 to 32 carbon atoms. Examples of the aryl groups include phenyl, 1-naphthyl and 2-naphthyl.

The heterocyclic group preferably has 1 to 32 carbon atoms. The heterocyclic group preferably has five to eight-membered ring. Examples of the heterocyclic groups include 2-thienyl, 4-pyridyl, 2-furyl, 2-pynmidinyl, 1-pyridyl, 2-benzothiazolyl, 1-imidazolyl, 1-pyrazolyl and benzotriazole-1-yl.

The alkoxy group preferably has 1 to 32 carbon atoms. Examples of the alkoxy groups include methoxy, ethoxy, 1-butoxy, 2-butoxy, isopropoxy, tert-butoxy and dodecyloxy.

The cycloalkoxy group preferably has 3 to 32 carbon atoms. Examples of the cycloalkoxy groups include cyclopentyloxy and cyclohexyloxy.

The aryloxy group preferably has 6 to 32 carbon atoms. Examples of the aryloxy groups include phenoxy and 2-naphthoxy.

The heterocyclicoxy group preferably has 1 to 32 carbon atoms. Examples of the heterocyclicoxy groups include 1-phenyltetrazole-5-oxy, 2-tetrahydropyranyloxy and 2-furyloxy.

The silyloxy group preferably has 1 to 32 carbon atoms. Examples of the silyloxy groups include tnmethylsilyloxy, tert-butyldimethylsilyloxy and dimethylphenylsilyloxy.

The acyloxy group preferably has 2 to 32 carbon atoms. Examples of the acyloxy groups include acetoxy, pivaloyloxy, benzoyloxy and dodecanoyloxy.

The alkoxycarbonyloxy group preferably has 2 to 32 carbon atoms. Examples of the alkoxycarbonyloxy groups include ethoxycarbonyloxy and tert-butoxycarbonyloxy.

The cycloalkoxycarbonyloxy group preferably has 4 to 32 carbon atoms. An example of the cycloalkomycarbonyloxy group is cyclohexyloxycarbonyloxy.

The aryloxycarbonyloxy group preferably has 7 to 32 carbon atoms. An example of the aryloxycarbonyloxy group is phenoxycarbonyloxy.

The carbamoyloxy group preferably has 1 to 32 carbon atoms. Examples of the carbamoyloxy groups include N,N-dimethylcarbamoyloxy and N-butylcarbamoylomy.

The sulfamoyloxy group preferably has 1 to 32 carbon atoms. Examples of the sulfamoyloxy groups include N,N-diethylsulfamoyloxy and N-propylsulfamoyloxy.

The alkanesulfonyloxy group preferably has 1 to 32 carbon atoms. Examples of the alkanesulfonyloxy groups include methanesulfonyloxy and hexadecanesulfonyloxy.

The arenesulfonyloxy group preferably 6 to 32 carbon atoms. An example of the arenesulfonyloxy group is benzenesulfonyloxy.

The acyl group preferably has 1 to 32 carbon atoms. Examples of the acyl groups include formyl, acetyl, pivaloyl, benzoyl and tetradecanoyl.

The alkoxycarbonyl group preferably has 2 to 32 carbon atoms. Examples of the alkoxycarbonyl groups include methoxycarbonyl, ethoxycarbonyl and octadecytcarbonyl.

The cycloalkoxycarbonyl group preferably has 2 to 32 carbon atoms. An example of the cycloalkoxycarbonyl group is cyclohexylcarbonyl.

The aryloxycarbonyl group preferably has 7 to 32 carbon atoms. An example of the aryloxycarbonyl group is phenoxycarbonyl.

The carbamoyl group preferably has 1 to 32 carbon atoms. Examples of the carbamoyl groups include carbamoyl, N,N-dibutylcarbamoyl, N-ethyl-N-octylcarbamoyl and N-propylcarbamoyl.

The amino group preferably has 0 to 32 carbon atoms. Examples of the amino groups include amino, methylamino, N,N-dioctylamino, tetradecylamino and octadecylamino.

The anilino group preferably has 6 to 32 carbon atoms. Examples of the anilino groups include anilino and N-methylanilino.

The heterocyclicamino group preferably has 1 to 32 carbon atoms. An example of the heterocyclicamino group is 4-pyridylamino.

The carbonamido group preferably has 2 to 32 carbon atoms. Examples of the carbonamido groups include acetamido, benzamido and tetradecanamido.

The ureido group preferably has 1 to 32 carbon atoms. Examples of the ureido groups include ureido, N,N-dimethylureido and N-phenylureido.

The imido group preferably has 1 to 10 carbon atoms. Examples of the imido groups include N-succinimido and N-phthalimido.

The alkoxycarbonylamino group preferably has 2 to 32 carbon atoms. Examples of the alkoxycarbonylamino groups include methoxycarbonylamino, ethoxycarbonylamino, tert-butoxycarbonylamino and octadecyloxycarbonylamino.

The aryloxycarbonylamino group preferably has 7 to 32 carbon atoms. An example of aryloxycarbonylamino group is phenoxycarbonylamino.

The sulfonamide group preferably has 1 to 32 carbon atoms. Examples of the sulfonamido groups include methanesulfonamido, butanesulfonamido, benzenesulfonamido and hexadecanesulfonamido.

The sulfamoylamino group preferably has 1 to 32 carbon atoms. Examples of the sulfamoylamino groups include N,N-dipropylsulfamoylamino and N-ethyl-N-dodecylsulfamoylamino.

The azo group preferably has 1 to 32 carbon atoms. An example of the azo group is phenylazo.

The alkylthio group preferably has 1 to 32 carbon atoms. Examples of the alkylthio groups include ethylthio and octylthio.

The arylthio group preferably has 1 to 32 carbon atoms. An example of the arylthio group is phenylthio.

The heterocyclicthio group preferably has 1 to 32 carbon atoms. Examples of the heterocyclicthio groups include 2-benzothiazolylthio, 2-pyridylthio and 1-phenyltetrazolylthio.

The alkylsulfinyl group preferably has 1 to 32 carbon atoms. An example of the alkylsulfinyl group is dodecanesulfinyl.

The arenesulfinyl group preferably has 6 to 32 carbon atoms. An example of the arenesulfinyl group is benzenesulfinyl.

The alkanesulfonyl group preferably has 1 to 32 carbon atoms. Examples of the alkanesulfonyl groups include methanesulfonyl and octanesulfonyl.

The arenesulfonyl group preferably has 6 to 32 carbon atoms. Examples of the arenesulfonyl groups include benzenesulfonyl and 1-naphthalenesulfonyl.

The sulfamoyl group preferably has 1 to 32 carbon atoms. Examples of the sulfamoyl groups include sulfamoyl, N,N-dipropylsulfamoyl and N-ethyl-N-dodecylsulfamoyl.

The phosphonyl group preferably has 1 to 32 carbon atoms. Examples of the phosphonyl groups include phenoxyphosphonyl, octylphosphonyl and phenylphosphonyl.

In the formula (II), $X^2$ is hydrogen or a substituent group that can be released by a coupling reaction. Examples of the releasable groups include a halogen atom, an alkoxy group, an aryloxy group, an acyloxy group, a carbamoyloxy group, a sulfonyloxy group, a carbonamido group, a sulfonamido group, a carbamoylamino group, a heterocyclic group, an arylazo group, an alkylthio group, an arylthio group and a heterocyclicthio group. Examples of these groups are the same as those described about $X^1$ and $X^3$.

A bis type may be formed by combining two molecules of four equivalents coupler by an aldehyde or a ketone. Further, $X^2$ may be a functional group, which function as a photographic additive or a precursor thereof. Examples of the photographic additives include a development accelerator, a development inhibitor, a silver bleaching agent and a dye.

The groups represented by $X^1$, $X^2$ and $X^3$ may further have a substituent group, such as a halogen atom, an alkyl group, a cycloalkyl group, an alkenyl group, an aryl group, a heterocyclic group, cyano, hydroxyl, nitro, carboxyl, an alkoxy group, a cycloalkoxy group, an aryloxy group, a heterocyclicoxy group, a silyloxy group, an acyloxy group, an alkoxycarbonyloxy group, a cycloalkoxycarbonyloxy group, an aryloxycarbonyloxy group, a carbamoyloxy group, a sulfamoyloxy group, an alkanesulfonyloxy group, an arenesulfonyloxy group, an acyl group, an alkoxycarbonyl group, a cycloalkoxycarbonyl group, an aryloxycarbonyl group, a carbamoyl group, an amino group, an anilino group, a heterocyclicamino group, a carbonamido group, an ureido group, an imido group, an alkoxycarbonylamino group, an aryloxycarbonylamino group, a sulfonamide group, a sulfamoylamino group, an azo group, an alkylthio group, an arylthio group, a heterocyclicthio group, an alkylsulfinyl group, an arenesulfinyl group, an alkanesulfonyl group, an arenesulfonyl group, a sulfamoyl group, sulfo and a phosphonyl group.

$X^1$ preferably is a secondary or tertiary alkyl group (e.g., isopropyl, cyclopropyl, tert-butyl, 1-methylpropyl), and more preferably is a tertiary alkyl group, and most preferably is tert-butyl.

$X^3$ preferably is an aryl group, and more preferably is phenyl. The phenyl preferably has a substituent group such as a halogen atom, an alkyl group, an aryl group, a heterocyclic group, cyano, hydroxyl, nitro, an alkoxy group, an aryloxy group, carboxyl, an acyl group, an alkoxycarbonyl group, a cycloalkoxycarbonyl group, an aryloxycarbonyl group, a carbamoyloxy group, an amino group, an anilino group, a carbonamido group, an alkoxycarbonylamino group, an aryloxycarbonylamino group, an ureido group, a sulfonamido group, a sulfamoylamino group, an imido group, an alkylthio group, an arylthio group, a heterocyclicthio group, a sulfamoyl group, a sulfinyl group, sulfo, an alkanesulfonyl group, an arenesulfonyl group and a phosphonyl group.

$X^2$ preferably is hydrogen, chlorine, bromine, an aryloxy group, an alkylthio group, a heterocyclicthio group or a heterocyclic group, more preferably is chlorine or an aryloxy group, and most preferably is chlorine.

A preferred coupler is represented by the formula (IIa):

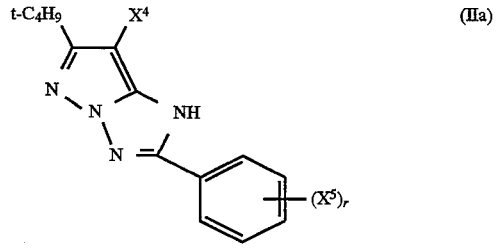

(IIa)

In the formula (IIa), $X^4$ is hydrogen or a substituent group that can be released by a coupling reaction. Preferred examples of $X^4$ are the same as those of $X^2$ described about the formula (II).

In the formula (IIa), $X^5$ is hydrogen or a substituent group. One of the groups represented by $X^5$ preferably is an alkoxy group, an aryloxy group, an acyl group, an alkoxycarbonyl group, a cycloalkoxycarbonyl group, an aryloxycarbonyl group, a carbamoyl group, an amino group, an anilino group, a carbonamido group, an alkoxycarbonylamino group, an aryloxycarbonylamino group, an ureido group, a sulfonamido group, a sulfamoylamino group, an imido group, an alkylthio group, an arylthio group or a sulfamoyl group. A carbonamido group and a sulfonamido group are preferred. A carbonamido group is particularly preferred.

The other groups represented by $X^5$ preferably is fluorine, chlorine, bromine, an alkyl group, a cycloalkyl group, a heterocyclic group, cyano, hydroxyl, nitro, an alkoxy group, an aryloxy group, carbonyl, an acyl group, an alkoxycarbonyl group, a cycloalkoxycarbonyl group, an aryloxycarbonyl group, a carbamoyl group, an amino group, an anilino group, a carbonamido group, an alkoxycarbonylamino group, an aryloxycarbonylamino group, an ureido group, a sulfonamido group, a sulfamoylamino group, an imido group, an alkylthio group, an arylthio group, a heterocyclicthio group, a sulfinyl group, sulfo, an alkanesulfonyl group, an arenesulfonyl group, a sulfamoyl group or a phosphonyl group.

In the formula (IIa), r is an integer of 1 to 5, preferably is 1, 2, 3 or 4, more preferably is 1 or 2, and most preferably is 1. When r is 2 or more, two or more groups of $X^5$ may be different from each other.

In the formula (IIa), $X^4$ preferably is chlorine or an aryloxy group, $X^5$ preferably is a carbonamido group attached at para position, and r preferably is 1.

Examples of the magenta couplers represented by the formula (II) are shown below.

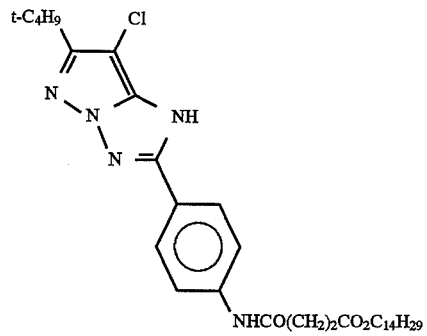

(M-1)

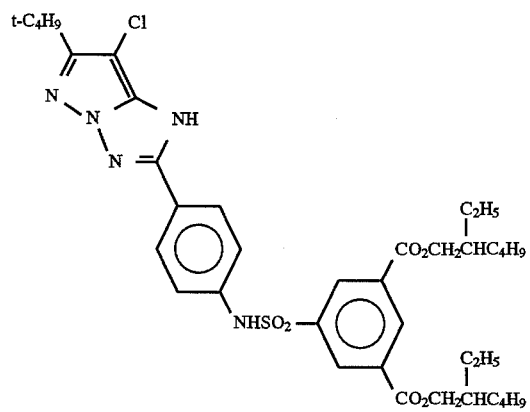

(M-2)

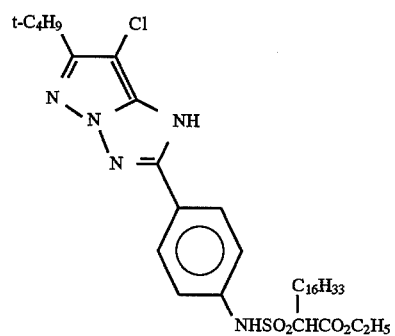

(M-3)

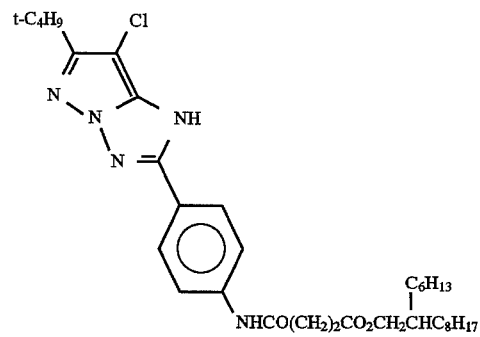

(M-4)

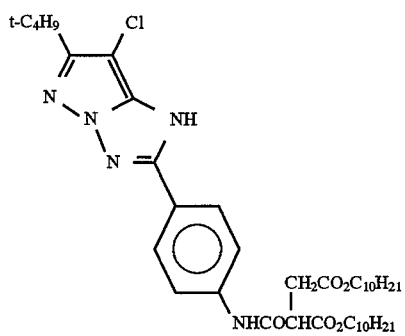
(M-5)
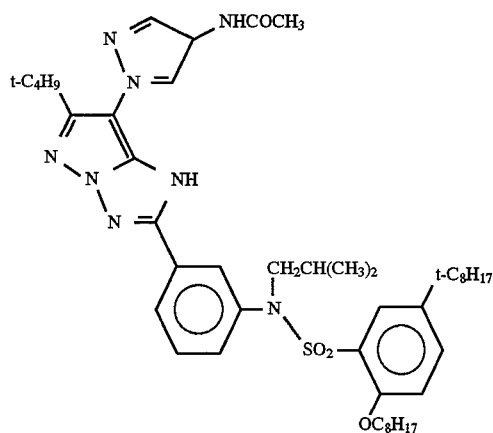
(M-6)
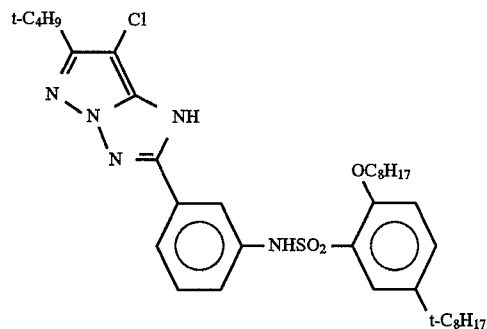
(M-7)
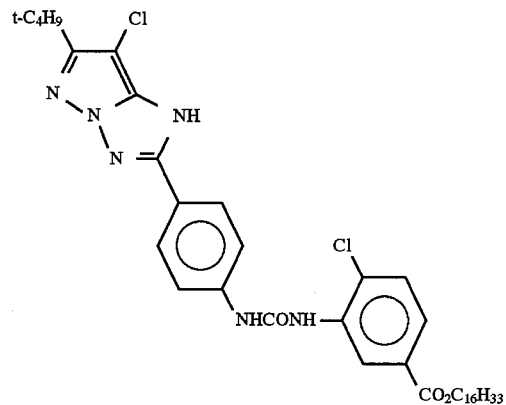
(M-8)

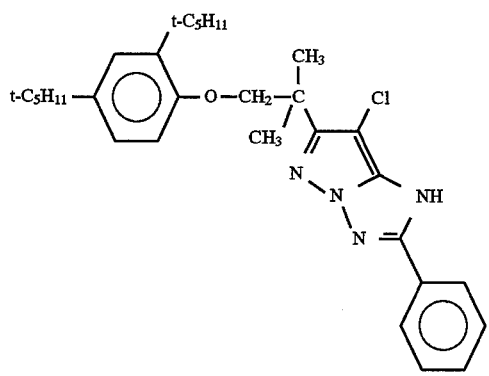
(M-9)
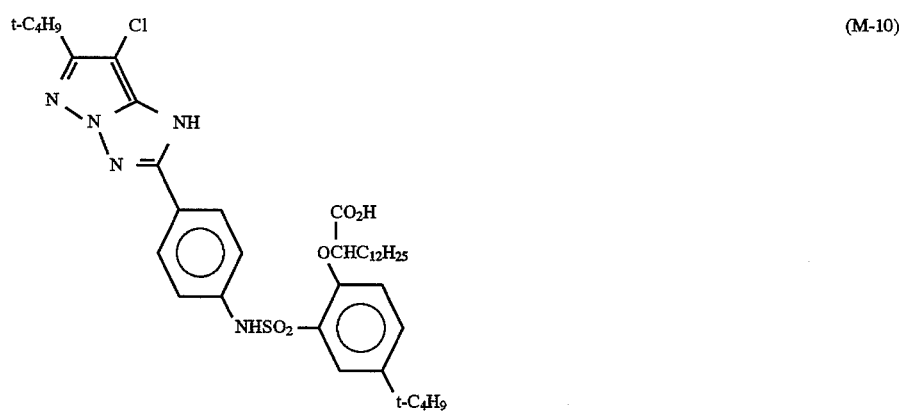
(M-10)
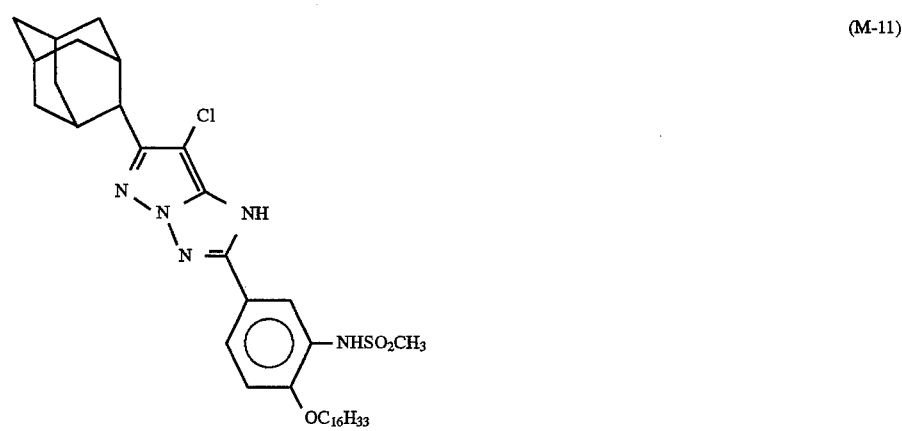
(M-11)
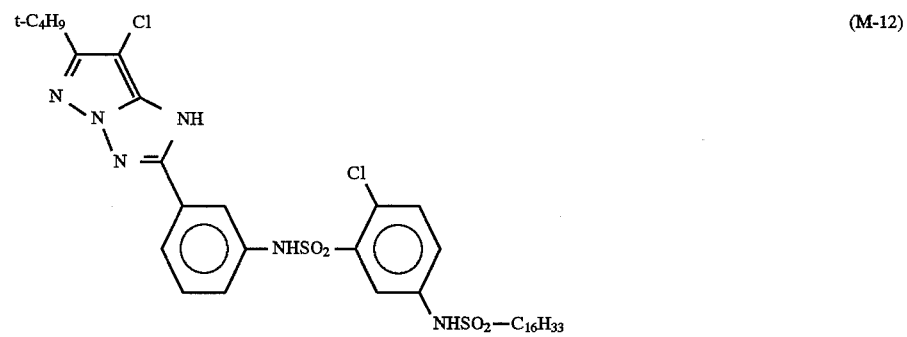
(M-12)

(M-13)
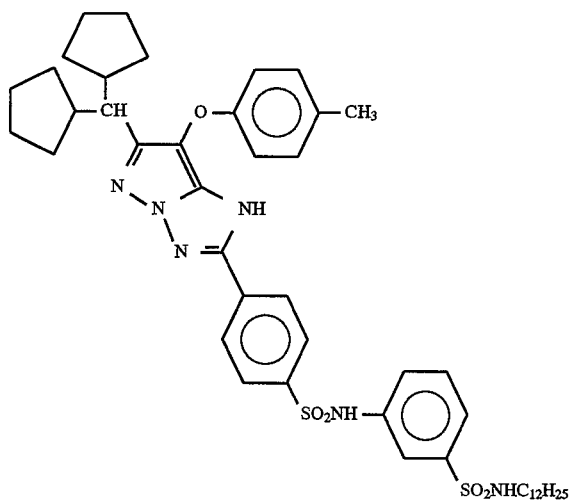
(M-14)
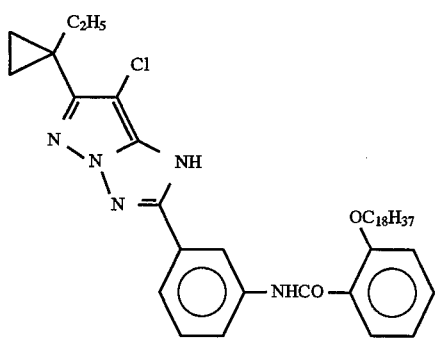
(M-15)
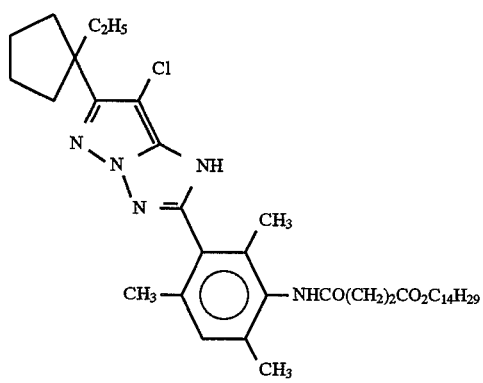
(M-16)
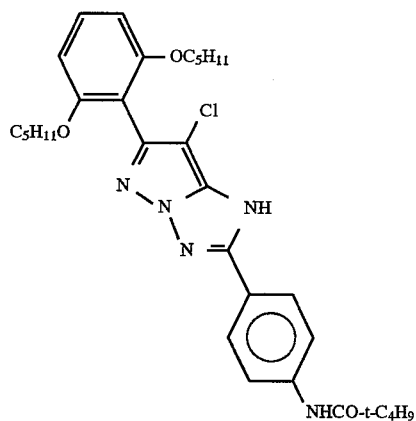

(M-17)
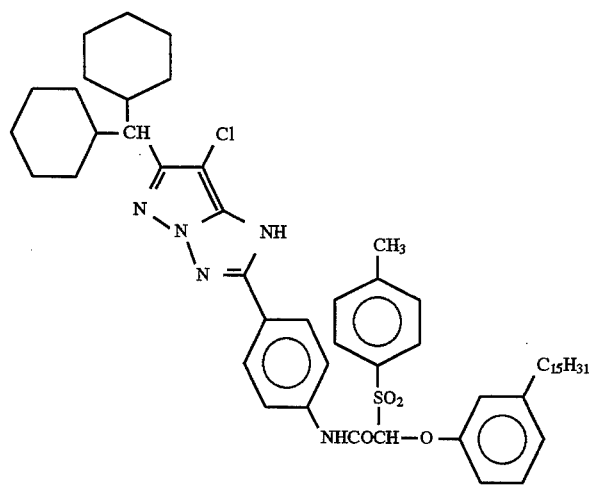
(M-18)
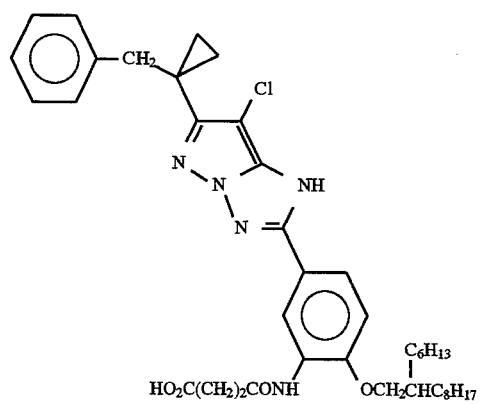
(M-19)
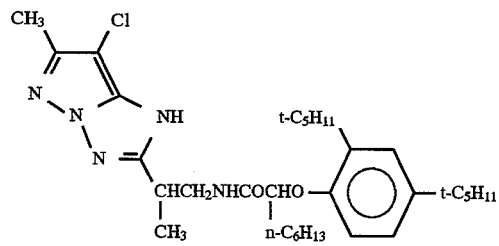
(M-20)
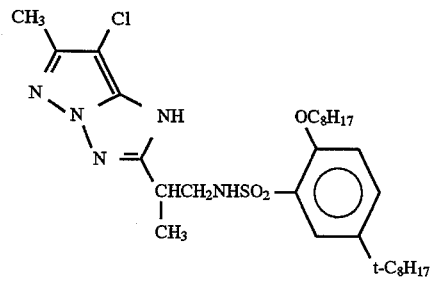

-continued
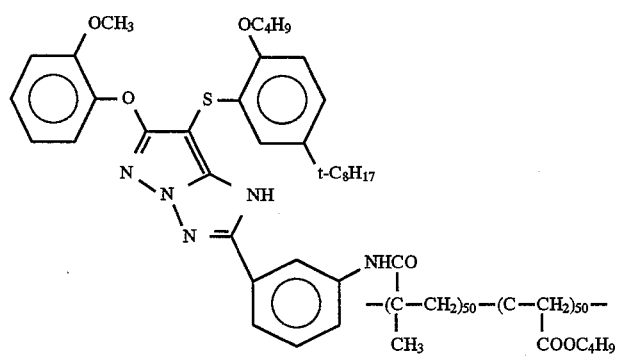
(M-21)
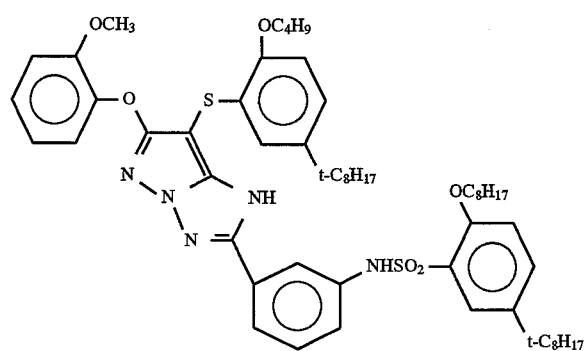
(M-22)
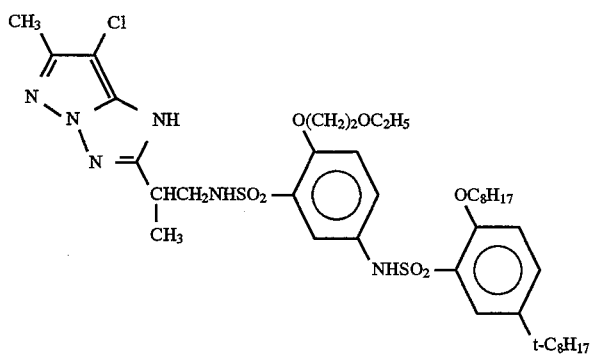
(M-23)
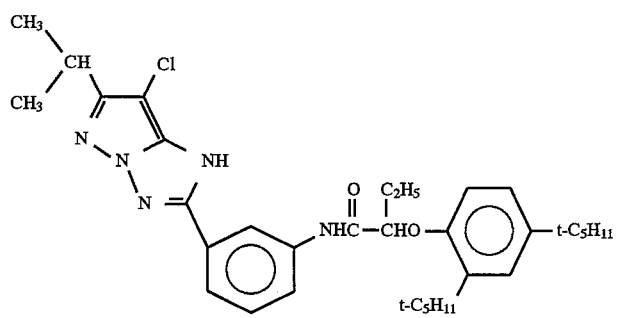
(M-24)

-continued
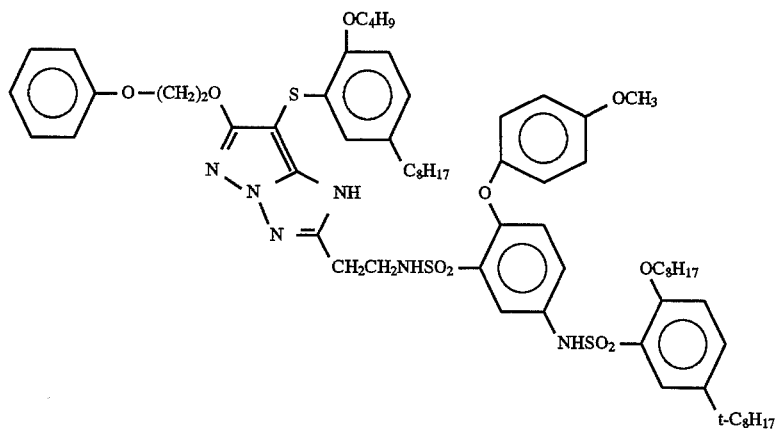
(M-25)
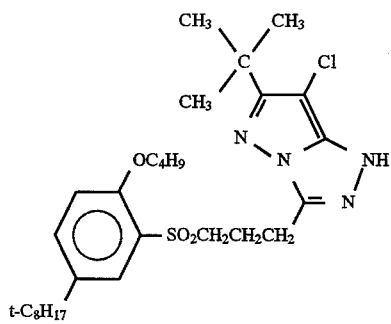
(M-26)
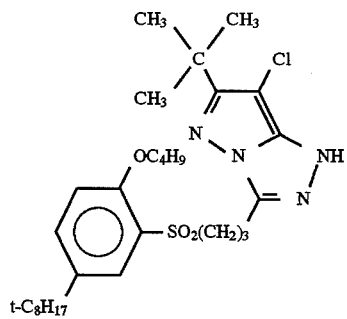
(M-27)
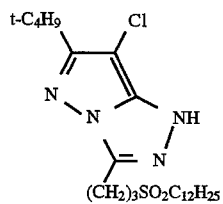
(M-28)
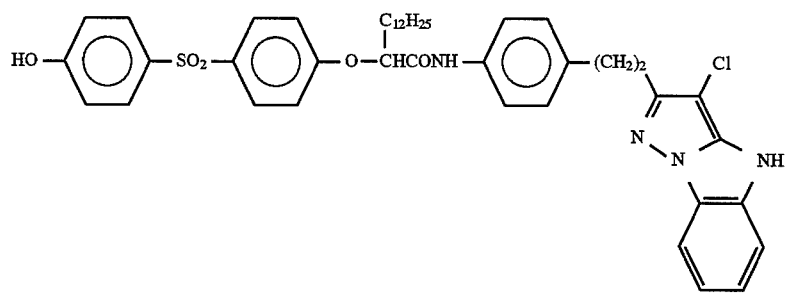
(M-29)

-continued

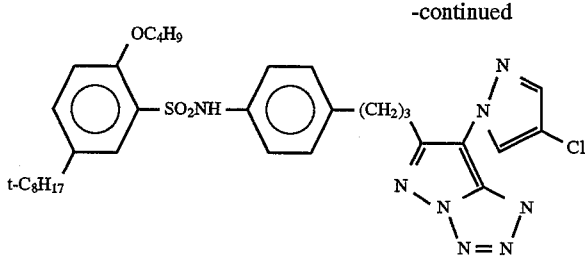

(M-30)

The amount of the coupler represented by the formula (II) is preferably in the range of $3\times10^{-5}$ to $3\times10^{-3}$ mol per $m^2$, and more preferably in the range of $3\times10^{-4}$ to $2\times10^{-3}$ mol per $m^2$.

The photographic material of the present invention can be processed according to a method described in Japanese Patent Provisional Publications No. 2(1990)-207250 on page 26, right lower column, line 1 to page 34, right upper column, line 9 and No. 4(1992)-97355 on page 5, left upper column on page 17 to page 18, right lower column, line 20.

EXAMPLE 1

Synthesis of Compound (1)

With 100 ml of methanol, 20 ml of N,N-dimethylformamide was mixed. The mixture was stirred in ice-cold water. To the mixture, 7.4 g of 1-(2,5-disulfophenyl)-3-carbamoyl-5-hydroxypyrazole and 9.1 ml of triethylamine were added to make a solution. To the solution, a dispersion of 3.6 g of chloride salt of 3-methylglutaconaldehydedianile in 30 ml of N,N-dimethylformamide was added for 15 minutes. The mixture was reacted for 5 hours at the room temperature. The impurities in the obtained blue solution was filtered out. To the filtrate, 11.8 g potassium acetate dissolved in 60 ml of methanol was added. To the mixture, 200 ml of isopropyl alcohol was added to form blue precipitation. The precipitation was filtered off, washed with methanol, and dissolved in 12 ml of water. To the solution, 60 ml of methanol was stepwise added to form precipitation. The precipitation was filtered off, washed with methanol and acetone, and dried. Thus, 3.5 g of the subject compound (1) in the form of powder was obtained. The yield was 35%. The chemical structure was confirmed by NMR, mass spectrum and elemental analysis ($\lambda$max in water: 656 nm, melting point: 300° C. or more).

EXAMPLE 2

Synthesis of Compound (2)

To 40 ml of N,N-dimethylformamide while stirring in ice-cold water, 8.2 g of 1-(2,5-disulfophenyl)-3-methylcarbamoyl-5-hydroxypyrazole and 9.1 ml of triethylamine were added to make a solution. To the solution, a dispersion of 3.6 g of chloride salt of 3-methylglutaconaldehydedianile in 30 ml of N,N-dimethylformamide was added for 15 minutes. The mixture was reacted for 3 hours at the room temperature. The impurities in the obtained blue solution was filtered out. To the filtrate, 11.8 g potassium acetate dissolved in 60 ml of methanol was added to form blue precipitation. The precipitation was filtered off, washed with methanol, and dissolved in 30 ml of water. To the solution, 150 ml of ethanol was stepwise added to form precipitation. The precipitation was filtered off, washed with methanol and acetone, and dried. Thus, 6.5 g of the subject compound (2) in the form of powder was obtained. The yield was 35%. The chemical structure was confirmed by NMR, mass spectrum and elemental analysis ($\lambda$max in water: 54 nm, melting point: 300° C. or more).

EXAMPLE 3

Synthesis of Compound (3)

To 40 ml of N,N-dimethylformamide while stirring in ice-cold water, 9.0 g of 1-(2,5-disulfophenyl)-3-ethoxycarbonylmethylcarbamoyl-5-hydroxypyrazole and 9.1 ml of triethylamine were added to make a solution. To the solution, a dispersion of 2.9 g of chloride salt of 3-methylglutaconaldehydedianile in 30 ml of N,N-dimethylformamide was added for 15 minutes. The mixture was reacted for 8 hours at the room temperature. The impurities in the obtained blue solution was filtered out. To the filtrate, 11.8 g potassium acetate dissolved in 60 ml of methanol was added to form blue precipitation. The precipitation was filtered off, washed with methanol, and dissolved in 30 ml of water. To the solution, 100 ml of methanol was stepwise added to form precipitation. The precipitation was filtered off, washed with methanol and acetone, and dried. Thus, 4.6 g of the subject compound (3) in the form of powder was obtained. The yield was 39%. The chemical structure was confirmed by NMR, mass spectrum and elemental analysis ($\lambda$max in water: 657 nm, melting point: 300° C. or more).

EXAMPLE 4

Synthesis of Compound (4)

To 40 ml of N,N-dimethylformamide while stirring in ice-cold water, 8.3 g of 1-(2,5-disulfophenyl)-3-dimethylcarbamoyl-5-hydroxypyrazole and 9.1 ml of triethylamine were added to make a solution. To the solution, a dispersion of 2.9 g of chloride salt of 3-methylglutaconaldehydedianile in 30 ml of N,N-dimethylformamide was added for 15 minutes. The mixture was reacted for 5 hours at the room temperature. The impurities in the obtained blue solution was filtered out. To the filtrate, 9.9 g sodium acetate dissolved in 60 ml of methanol was added to form blue precipitation. The precipitation was filtered off, washed with methanol, and dissolved in 30 ml of water. To the solution, 150 ml of methanol was stepwise added to form precipitation. The precipitation was filtered off, washed with methanol and acetone, and dried. Thus, 6.0 g of the subject compound (4) in the form of powder was obtained. The yield was 57%. The chemical structure was confirmed by NMR, mass spectrum and elemental analysis ($\lambda$max in water: 651 nm, melting point: 300° C. or more).

EXAMPLE 5

Synthesis of Compound (5)

To 45 ml of N,N-dimethylformamide while stirring in ice-cold water, 7.5 g of 1-(2,5-disulfophenyl)-3-methylcarbamoyl-5-hydroxypyrazole and 9.8 ml of triethylamine were added to make a solution. To the solution, a dispersion of 0.3.1 g of chloride salt of 3-ethylglutaconaldehydedianile in 30 ml of N,N-dimethylformamide was added for 15 minutes. The mixture was reacted for 5 hours at the room temperature. The impurities in the obtained blue solution was filtered out. To the filtrate, 9.9 g sodium acetate dissolved in 60 ml of methanol was added to form blue precipitation. The precipitation was filtered off, washed with methanol, and dissolved in 15 ml of water. To the solution, 50 ml of methanol was stepwise added to form precipitation. The precipitation was filtered off, washed with methanol and acetone, and dried. Thus, 3.5 g of the subject compound (5) in the form of powder was obtained. The yield was 37%. The chemical structure was confirmed by NMR, mass spectrum and elemental analysis (λmax in water: 658 nm, melting point: 300° C. or more).

EXAMPLE 6

Synthesis of Compound (11)

With 40 ml of N,N-dimethylformamide, 8.2 g of 1-(2,5-disulfophenyl)-3-(2-hydroxyethylcarbamoyl)-5-hydroxypyrazole and 9.1 ml of triethylamine were mixed. To the mixture, 3.5 g of bromide salt of 3-ethylglutaconaldehydedianile was added while stirring in ice-cold water. The mixture was stirred for 2 hours at the room temperature. The impurities in the solution was filtered out. To the filtrate, 9 g potassium acetate dissolved in 45 ml of methanol was added to form precipitation. The precipitation was filtered off, washed with methanol, and dissolved in 30 ml of water. To the solution, 100 ml of methanol was added to form crystals. The crystals were filtered off, washed with methanol, and dried. Thus, 8.2 g of the subject compound (11) was obtained. The yield was 76%. The chemical structure was confirmed by NMR, mass spectrum and elemental analysis (λmax in water: 652 nm, melting point: 300° C. or more).

EXAMPLE 7

Synthesis of Compound (21)

To 20 ml of N,N-dimethylformamide while stirring in ice-cold water, 3.4 g of 1-(2,5-disulfophenyl)-3-methylcarbamoyl-5-hydroxypyrazole and 5.6 ml of triethylamine were added to make a solution. To the solution, a dispersion of 2.1 g of 3-(2-sulfoethyl)glutaconaldehydedianile in 25 ml of methanol was added for 10 minutes. The mixture was reacted for 6 hours at the room temperature. The impurities in the obtained blue solution was filtered out. To the filtrate, 11.8 g potassium acetate dissolved in 60 ml of methanol was added to form blue precipitation. The precipitation was filtered off, washed with methanol, and dissolved in 12 ml of water. To the solution, 60 ml of methanol was stepwise added to form precipitation. The precipitating procedures were repeated three times. The precipitation was filtered off, washed with methanol and acetone, and dried. Thus, 1.7 g of the subject compound (21) in the form of powder was obtained. The yield was 31%. The chemical structure was confirmed by NMR, mass spectrum and elemental analysis (λmax in water: 670 nm, melting point: 300° C. or more).

EXAMPLE 8

Synthesis of compound (27)

To 50 ml of N,N-dimethylformamide while stirring in ice-cold water, 10.1 g of disodium salt of 1-(2,5-disulfophenyl)-3-(N-methyl-2-sulfoethylcarbamoyl)-5-hydroxypyrazole and 10.8 ml of triethylamine were added to make a solution. The solution was cooled to −10° C. To the solution, 4.6 g of powder of bromide salt of 3-methylglutaconaldehydedianile was added for 20 minutes. The mixture was reacted for 4 hours at 5° C. The impurities in the obtained blue solution was filtered out. To the filtrate, 7.0 g potassium acetate dissolved in 50 ml of methanol was added to form blue precipitation. The precipitation was filtered off, washed with methanol, and dissolved in 20 ml of water. To the solution, 15.0 g of potassium acetate in 60 ml of methanol was stepwise added to form precipitation. The precipitating procedures were repeated twice. The precipitation was filtered off, washed with methanol and acetone, and dried. Thus, 2.1 g of the subject compound (26) in the form of powder was obtained. The yield was 9%. The chemical structure was confirmed by NMR, mass spectrum and elemental analysis (λmax in water: 651 nm, melting point: 300° C. or more).

EXAMPLE 9

Evaluation of Stability of Dye in Solution

The stability of the dye in an aqueous solution was determined.

The solvent was BR (Britton-Robinson) buffer at pH 6.0 or 10.0. The dye density was $1\times10^{-5}$ mol per liter. The temperature was 25° C. in a thermostat. The experiments were conducted in a darkroom.

The density at the absorption maximum of the spectrum of the solution immediately after the preparation (A0). Further, the solution was left for 24 hours, and the density was measured (A24). The remaining ratio (A24/A0) of the dye was measured. A dye having a value near 1 is stable. The results are set forth in Table 1

TABLE 1

| | Remaining ratio (A24/A0) | |
|---|---|---|
| Dye | pH 6.0 | pH 10.0 |
| C-1 | 0.95 | 0.75 |
| C-3 | 0.94 | 0.68 |
| C-5 | 0.90 | 0.19 |
| C-6 | 0.96 | 0.82 |
| (1) | 0.99 | 0.97 |
| (2) | 0.99 | 0.98 |
| (3) | 0.98 | 0.96 |
| (4) | 0.99 | 0.98 |
| (5) | 0.97 | 0.95 |
| (9) | 0.96 | 0.94 |
| (11) | 0.99 | 0.97 |
| (21) | 0.96 | 0.94 |
| (24) | 0.99 | 0.98 |
| (27) | 0.99 | 0.97 |

TABLE 1-continued
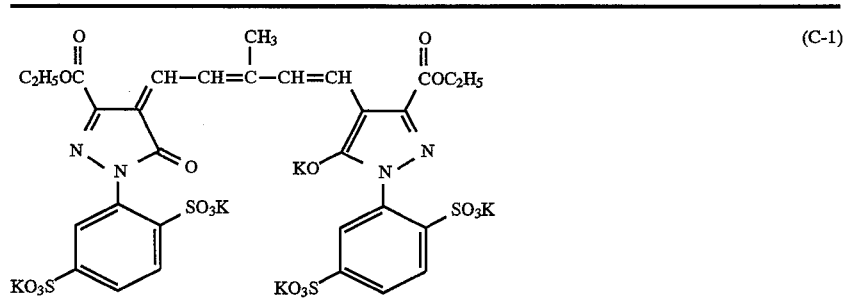
(C-1)
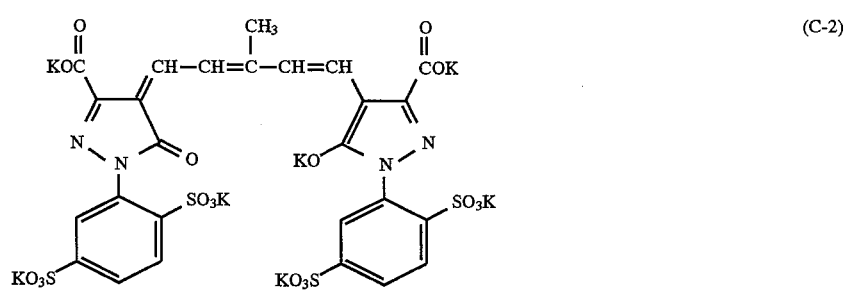
(C-2)
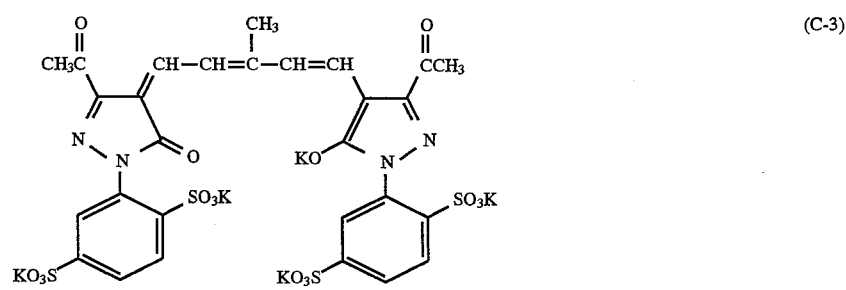
(C-3)
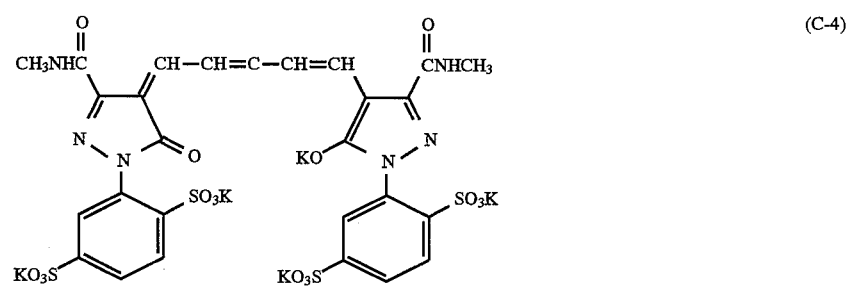
(C-4)
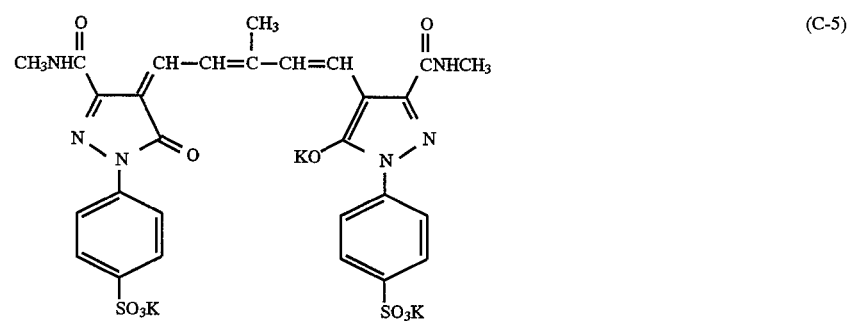
(C-5)

TABLE 1-continued

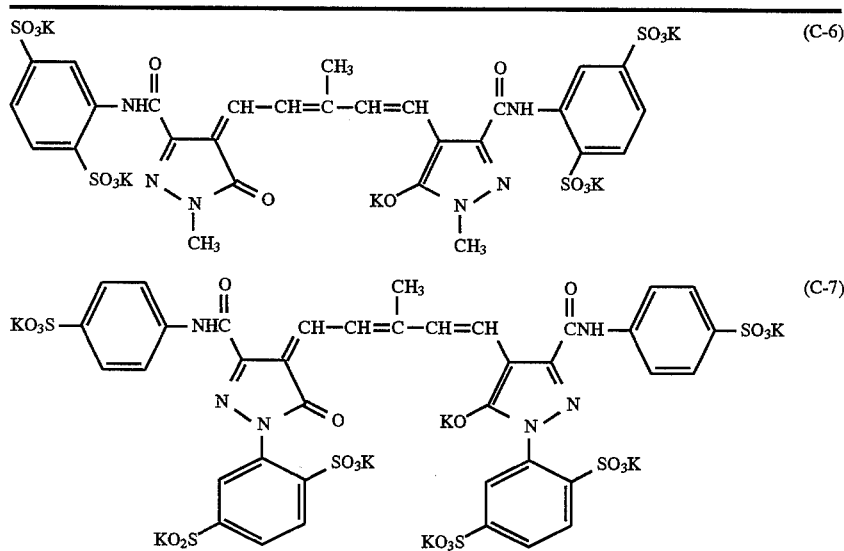

As is evident from the results shown in Table 1, the dyes of the present invention are stable in an aqueous solution.

EXAMPLE 10

Preparation of Sample No. 101

The following coating solutions were coated on reflective support to prepare a multi-layered color photographic material (sample No. 101).

Preparation of Coating Solution for the Third Layer

In 32.5 g of the solvent (Solv-3), 97.5 g of the solvent (Solv-4), 65.0 g of the solvent (Solv-6) and 110 cc of ethyl acetate, 40.0 g of the magenta coupler (ExM), 40.0 g of the ultraviolet absorbent (UV-2), 7.5 g of the color image stabilizer (Cpd-2), 25.0 g of the color image stabilizer (Cpd-5), 2.5 of the color image stabilizer (Cpd-6), 20.0 g of the color image stabilizer (Cpd-6), 20.0 g of the color image stabilizer (Cpd-7), 2.5 g of the color image stabilizer (Cpd-8) and 5.0 g of the color image stabilizer (Cpd-10) were dissolved. The solution was emulsified in 150 g of 7% aqueous gelatin solution containing 90 ml of 10% sodium dodecylbenzenesulfonate solution to obtain an emulsion A.

Silver chlorobromide emulsion (B-1) was prepared by mixing a large cubic emulsion having the average grain size of 0.55 μm with a small emulsion having the average grain size of 0.39 μm. The ratio of the large emulsion to the small emulsion was 1:3 (silver molecular ratio). The distribution coefficients of the large and small emulsions were 0.08 and 0.06, respectively. A localized phase containing 0.8 mol % of silver bromide was formed on the surface of the basis grain of silver chloride in each of the emulsions. The basis grain and the localized phase contain 0.1 mg of potassium hexachloroiridate (IV) and 1.0 mg of potassium ferrocyanide. The large emulsion contains the green sensitizing dyes D, E, F in the amount of $3.0 \times 10^{-4}$ mol, $4.0 \times 10^{-5}$ mol and $2.0 \times 10^{-4}$ mol based on 1 mol of silver halide, respectively. The small emulsion contains the green sensitizing dyes D, E, F in the amount of $3.6 \times 10^{-4}$ mol, $7.0 \times 10^{-5}$ mol and $2.8 \times 10^{-4}$ mol, respectively. Further, a sulfur sensitizer and a gold sensitizer was added to the emulsion in the presence of decomposed nucleic acid. The emulsion was then subjected to a chemical sensitization at the optimum conditions.

The emulsion A was mixed with the silver chlorobromide emulsion B-1 to prepare a coating solution for the third layer.

The coating solutions for the other layers were prepared in the same manner as in the preparation of the coating solution for the third layer. To each of the layers, sodium salt of 1-oxy-3,5-dichloro-s-triazine was added as a hardening agent.

Further, the compounds Cpd-12 and Cpd-13 were added to each layers. The total amounts of Cpd-12 and Cpd-13 were 25.0 mg per m² and 50.0 mg per m², respectively.

The silver chlorobromide emulsions were prepared in the same manner as in the preparation of the emulsion B-1, except that the following sensitizing dyes were used.

Sensitizing dyes for blue sensitive emulsion layer (Sensitizing dye A)

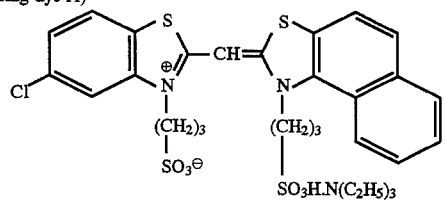

(Sensitizing dye B)

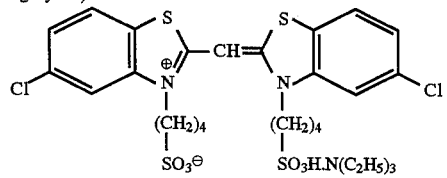

(Sensitizing dye C)

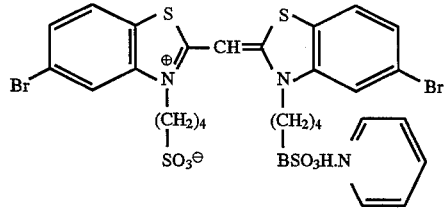

The amounts of the dyes in the large emulsion were $1.4 \times 10^{-4}$ mol based on 1 mol of silver halide. The amounts of the dyes in the small emulsion were $1.7 \times 10^{-4}$ mol based on 1 mol of silver halide.

Sensitizing dyes for green sensitive emulsion layer (Sensitizing dye D)

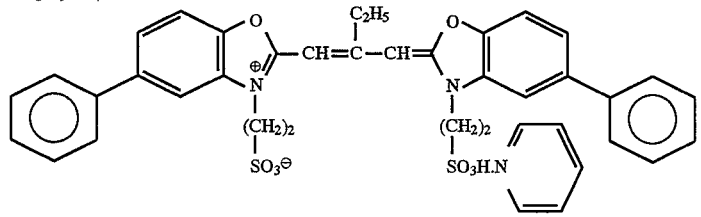

(Sensitizing dye E)

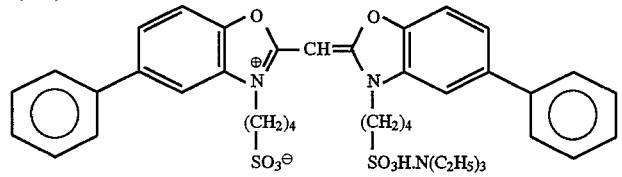

(Sensitizing dye F)

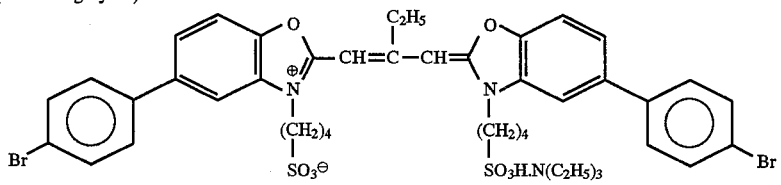

The amount of the dye D in the large emulsion was $3.0\times10^{-4}$ mol based on 1 mol of silver halide, and the amount of the dye D in the small emulsion was $3.6\times10^{-4}$ mol. The amount of the dye E in the large emulsion was $4.0\times10^{-4}$ mol, and the amount of the dye E in the small emulsion was $7.0\times10^{-4}$ mol. The amount of the dye F in the large emulsion was $2.0\times10^{-4}$ mol, and the amount of the dye E in the small emulsion was $2.8\times10^{-4}$ mol.

Sensitizing Dyes for Green Sensitive Emulsion Layer

The sensitizing dyes S-23 and S-45 were used. The amount of the dye S-23 in the large emulsion was $4.0\times10^{-5}$ mol, and the amount of the dye S-23 in the small emulsion was $5.0\times10^{-5}$ mol. The amount of the dye S-45 in the large emulsion was $5.0\times10^{-5}$ mol, and the amount of the dye S-45 in the small emulsion was $6.0\times10^{-5}$ mol.

Further, the following compound was added to the red sensitive emulsion layer in the amount of $2.6\times10^{-3}$ mol based on 1 mol of silver halide.

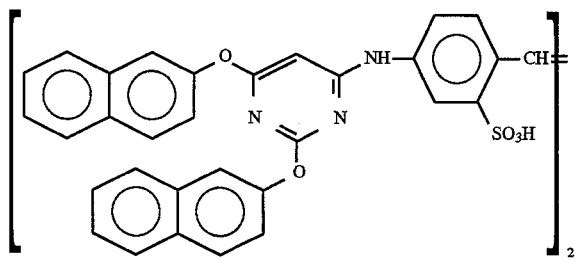

Furthermore, 1-(5-methylureidophenyl)-5-mercaptotetrazole was added to the blue, green and red sensitive emulsion layers in the amounts of $8.5\times10^{-4}$ mol, $3.0\times10^{-3}$ mol and $2.5\times10^{-4}$ mol based on 1 mol of silver halide, respectively.

Moreover, 4-hydroxy-6-methyl-1,3,3a,7-tetrazaindene was added to the blue and green sensitive emulsion layers in the amounts of $1\times10^{-4}$ mol and $2\times10^{-4}$ mol based on 1 mol of silver halide, respectively.

Layered Structure

The compositions of the layers are shown below. In the following layers, the amount is the coating amount (g per m$^2$, except that the amount of the silver halide emulsion means the amount of the coated silver.

| Seventh layer (protective layer) | |
|---|---|
| Gelatin | 0.90 |
| Polyvinyl alcohol copolymer denatured with acrylate (denatured ratio: 17%) | 0.05 |
| Fluid paraffin | 0.02 |
| Color image stabilizer (Cpd-11) | 0.01 |
| Sixth layer (ultraviolet absorbing layer) | |
| Gelatin | 0.48 |
| Ultraviolet absorbent (UV-1) | 0.38 |
| Color image stabilizer (Cpd-5) | 0.01 |
| Color image stabilizer (Cpd-7) | 0.05 |
| Solvent (Solv-9) | 0.05 |
| Fifth layer (red sensitive emulsion layer) | |
| Silver chlorobromide emulsion (C-1) | 0.18 |

(A large cubic emulsion having the average grain size of 0.50 µm was mixed with a small emulsion having the average grain size of 0.41 µm. The ratio of the large emulsion to the small emulsion was 1:4 (silver molecular ratio). The distribution coefficients of the large and small emulsions were 0.09 and 0.11, respectively. A localized phase containing 0.8 mol % of silver bromide was formed on the surface of the basis grain of silver chloride in each of the emulsions. The basis grain and the localized phase contain 0.3 mg of potassium hexachloroiridate (IV) and 1.5 mg of potassium ferrocyanide.)

| | |
|---|---|
| Gelatin | 0.80 |
| Cyan coupler (ExC) | 0.33 |
| Ultraviolet absorbent (UV-2) | 0.18 |
| Color image stabilizer (Cpd-1) | 0.33 |
| Color image stabilizer (Cpd-2) | 0.03 |
| Color image stabilizer (Cpd-6) | 0.01 |
| Color image stabilizer (Cpd-8) | 0.01 |
| Color image stabilizer (Cpd-9) | 0.02 |
| Color image stabilizer (Cpd-10) | 0.01 |
| Solvent (Solv-I) | 0.01 |
| Solvent (Solv-7) | 0.22 |
| Fourth layer (color stain inhibiting layer) | |
| Gelatin | 0.68 |
| Color stain inhibitor (Cpd-4) | 0.06 |
| Solvent (Solv-1) | 0.07 |
| Solvent (Solv-2) | 0.11 |
| Solvent (Solv-3) | 0.18 |
| Solvent (Solv-8) | 0.02 |
| Third layer (green sensitive emulsion layer) | |
| Silver chlorobromide emulsion (B-1) | 0.13 |
| Gelatin | 1.45 |
| Magenta coupler (ExM) | 0.16 |
| Ultraviolet absorbent (UV-2) | 0.16 |
| Color image stabilizer (Cpd-2) | 0.03 |
| Color image stabilizer (Cpd-5) | 0.10 |
| Color image stabilizer (Cpd-6) | 0.01 |
| Color image stabilizer (Cpd-7) | 0.08 |
| Color image stabilizer (Cpd-8) | 0.01 |
| Color image stabilizer (Cpd-10) | 0.02 |
| Solvent (Solv-3) | 0.13 |
| Solvent (Solv-4) | 0.39 |
| Solvent (Solv-6) | 0.26 |
| Second layer (color stain inhibiting layer) | |
| Gelatin | 0.90 |
| Color stain inhibitor (Cpd-4) | 0.08 |
| Solvent (Solv-1) | 0.10 |

-continued

| | |
|---|---|
| Solvent (Solv-2) | 0.15 |
| Solvent (Solv-3) | 0.25 |
| Solvent (Solv-8) | 0.03 |
| First layer (blue sensitive emulsion layer) | |
| Silver chlorobromide emulsion (A-1) | 0.27 |

(A large cubic emulsion having the average grain size of 0.88 μm was mixed with a small emulsion having the average grain size of 0.70 μm. The ratio of the large emulsion to the small emulsion was 5:5 (silver molecular ratio). The distribution coefficients of the large and small emulsions were 0.08 and 0.10, respectively. A localized phase containing 0.3 mol % of silver bromide was formed on the surface of the basis grain of silver chloride in each of the emulsions. The basis grain and the localized phase contain 0.1 mg of potassium hexachloroiridate (IV) and 1.0 mg of potassium ferrocyanide.)

| | |
|---|---|
| Gelatin | 1.22 |
| Yellow coupler (ExY) | 0.79 |
| Color image stabilizer (Cpd-1) | 0.08 |
| Color image stabilizer (Cpd-2) | 0.04 |
| Color image stabilizer (Cpd-3) | 0.08 |
| Color image stabilizer (Cpd-5) | 0.01 |
| Solvent (Solv-1) | 0.13 |
| Solvent (Solv-5) | 0.13 |

Reflective Support

A polyethylene film was laminated on a paper support. The film contains titanium dioxide in the amount of 18 wt. %. The titanium dioxide was surface treated with aluminum oxide. Further, a gelatin undercoating layer was provided on the support, after the support was subjected to a corona discharge treatment.

The additives for the layers are shown below.

ExY

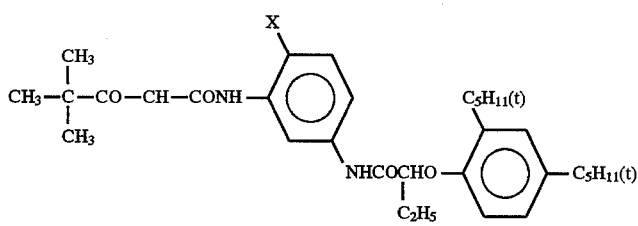

A mixture (1:1 in molar ratio) of

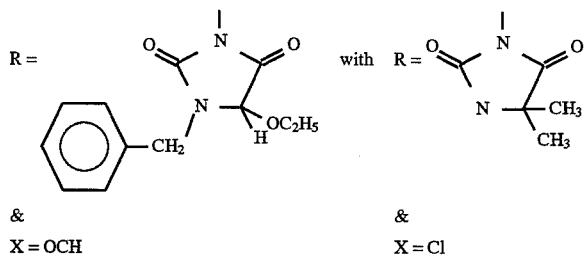

& &
X = OCH  X = Cl

ExM
A mixture (1:1 in molar ratio) of M-1 and M-19

ExC
A mixture (25:75 in molar ratio) of

-continued
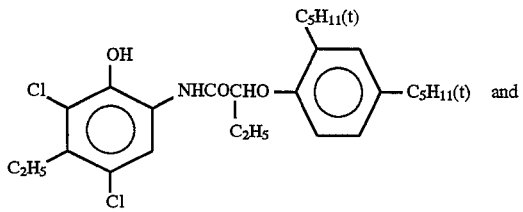
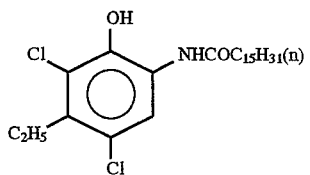
Cpd-1
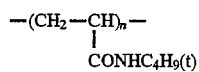
(number average molecular weight: 60,000)
Cpd-2
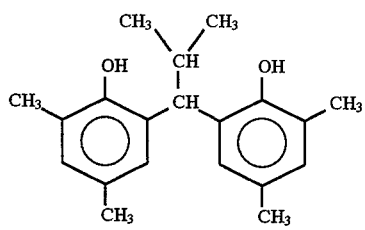
Cpd-3
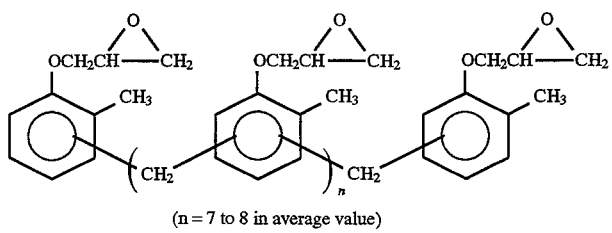
(n = 7 to 8 in average value)
Cpd-4
A mixture (1:1:1 in weight ratio) of
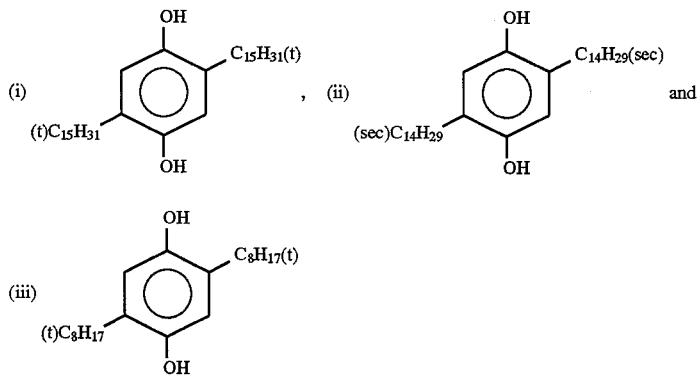
Cpd-5

-continued
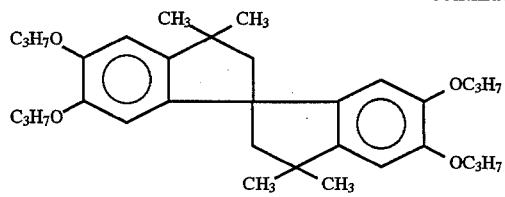
Cpd-6
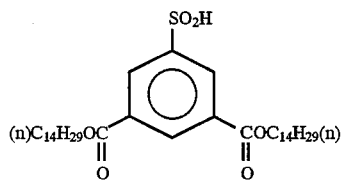
Cpd-7
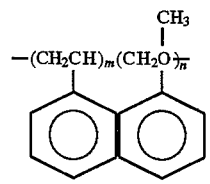
(m/n = 10/90, number average molecular weight: 600)
Cpd-8
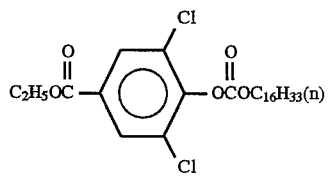
Cpd-9
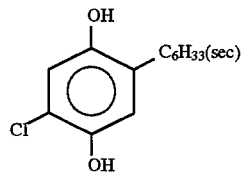
Cpd-10
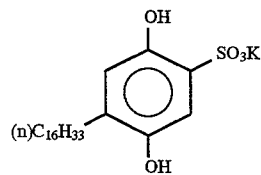
Cpd-11
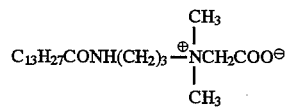
Cpd-12

-continued
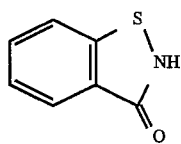
Cpd-13
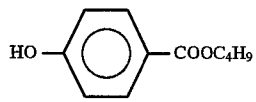
UV-1
A mixture (1:3:1:3 in the weight ratio) of
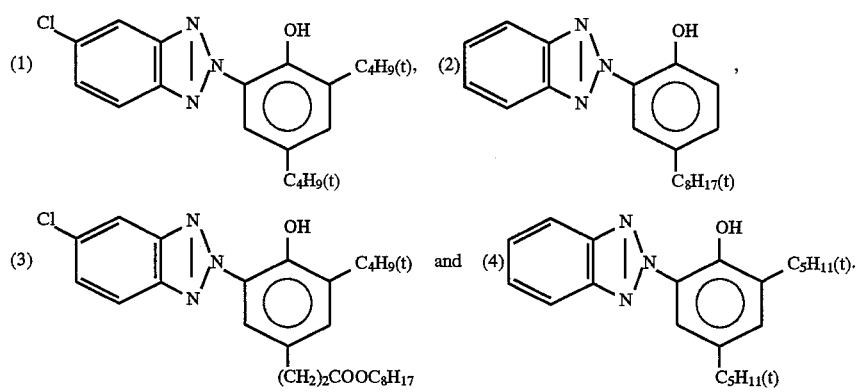
UV-2
A mixture (2:3:4 in the weight ratio) of
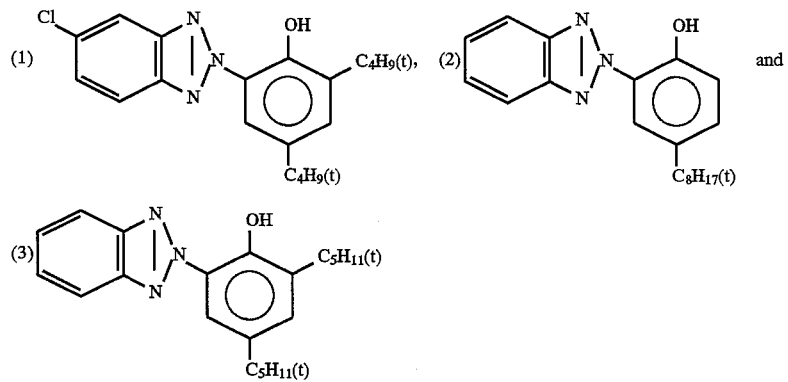
Solv-1
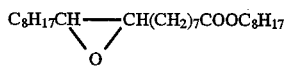
Solv-2
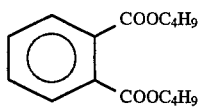
Solv-3
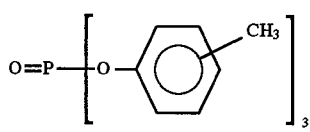
Solv-4

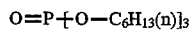

Solv-5

Solv-6

COOC$_4$H$_9$
|
(CH$_2$)$_8$
|
COOC$_4$H$_9$

Solv-7

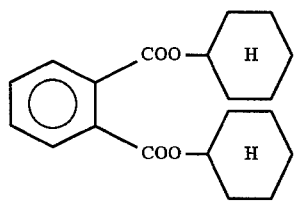

Solv-8

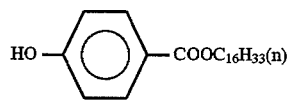

Solv-9

COOC$_8$H$_{17}$
|
(CH$_2$)$_8$
|
COOC$_8$H$_{17}$

To the sixth layer, the following water soluble dyes (a) (amount: 10 mg per m$^2$) and (b) (amount: 5 mg per m$^2$) were added as antiirradiation dyes for blue and green lights. The dyes were diffused from the added layer to all the coated layers uniformly.

Water soluble dye (a)

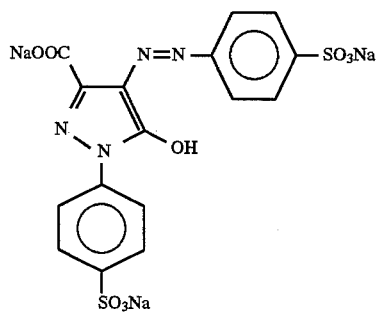

Water soluble dye (b)

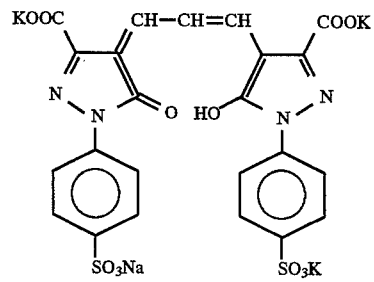

Preparations of Samples No. 102 to No. 136

Samples No. 102 to 136 were prepared in the same manner as in the preparation of the sample No. 101, except that water soluble dyes set forth in Tables 2 and 3 were added to the second and fourth layers. The amounts of the dyes were 50 mg per m$^2$. The dyes were diffused from the added layer to all the coated layers uniformly.

TABLE 2

| Sample No. | Added dye | Absorption maximum | Stability | Remaining Color |
| --- | --- | --- | --- | --- |
| 101 | None | — | — | 0.098 |
| 102 | C-1 | 693 nm | 0.80 | 0.102 |

TABLE 2-continued

| Sample No. | Added dye | Absorption maximum | Stability | Remaining Color |
|---|---|---|---|---|
| 103 | C-2 | 678 nm | 0.85 | 0.113 |
| 104 | C-3 | 700 nm | 0.72 | 0.101 |
| 105 | C-4 | 661 nm | 0.97 | 0.101 |
| 106 | C-5 | 683 nm | 0.74 | 0.121 |
| 107 | C-6 | 682 nm | 0.83 | 0.107 |
| 108 | C-7 | 687 nm | 0.97 | 0.111 |
| 109 | (1) | 685 nm | 0.97 | 0.099 |
| 110 | (2) | 684 nm | 0.97 | 0.098 |
| 111 | (3) | 687 nm | 0.96 | 0.102 |
| 112 | (4) | 680 nm | 0.98 | 0.101 |
| 113 | (5) | 688 nm | 0.95 | 0.099 |
| 114 | (6) | 685 nm | 0.98 | 0.103 |
| 115 | (7) | 687 nm | 0.95 | 0.102 |
| 116 | (8) | 682 nm | 0.96 | 0.104 |
| 117 | (9) | 693 nm | 0.96 | 0.103 |
| 118 | (10) | 690 nm | 0.99 | 0.100 |

TABLE 3

| Sample No. | Added dye | Absorption maximum | Stability | Remaining Color |
|---|---|---|---|---|
| 119 | (11) | 683 nm | 0.97 | 0.099 |
| 120 | (12) | 685 nm | 0.96 | 0.102 |
| 121 | (13) | 690 nm | 0.95 | 0.102 |
| 122 | (14) | 685 nm | 0.96 | 0.103 |
| 123 | (15) | 688 nm | 0.97 | 0.100 |
| 124 | (16) | 682 nm | 0.95 | 0.103 |
| 125 | (17) | 682 nm | 0.95 | 0.105 |
| 126 | (18) | 684 nm | 0.99 | 0.099 |
| 127 | (19) | 685 nm | 0.98 | 0.100 |
| 128 | (20) | 687 nm | 0.98 | 0.099 |
| 129 | (21) | 695 nm | 0.96 | 0.102 |
| 130 | (22) | 696 nm | 0.95 | 0.101 |
| 131 | (23) | 689 nm | 0.96 | 0.103 |
| 132 | (24) | 702 nm | 0.95 | 0.099 |
| 133 | (25) | 684 nm | 0.99 | 0.102 |
| 134 | (26) | 683 nm | 0.98 | 0.104 |
| 135 | (27) | 681 nm | 0.98 | 0.100 |
| 136 | (28) | 680 nm | 1.00 | 0.099 |

The samples were evaluated about the stability and the remaining color.

a) Stability of Color in the Photographic Material

The samples No. 102 to 136 were stored for 3 days in a refrigerator, or stored for 3 days at 50° C. and the relative humidity of 80%. The reflection spectrum densities of the samples were then measured. The ratio of the sample stored at 50° C. and 80% to the cooled sample was determined. The sample having a value of near 1 is stable.

b) Remaining Color

With respect to samples No. 101 to No. 136, a fogged sample (25%) exposed to white light and unexposed sample (75%) were prepared using different developing solutions. The samples were exposed to light using a sensitometry (FWH type, color temperature of light source: 3,200K, Fuji Photo Film Co., Ltd.) through a color separation filter and a gradation wedge. The samples were developed with the following developing solutions.

The cyan density (Dc) of the unexposed area was measured. The difference of the density (Dc) and the density ($D^0c$) of the sample No. 101 means the remaining color of the water soluble dye. The difference preferably is small.

| Processing | Time | Temp. | Tank | Replenish |
|---|---|---|---|---|
| Color development | 45 seconds | 38.5° C. | 8 1 | 78 ml/m² |
| Fix-bleaching | 45 seconds | 30–35° C. | 8 1 | 60 ml/m² |
| Rinsing (1) | 20 seconds | 30–35° C. | 4 1 | |
| Rinsing (2) | 20 seconds | 30–35° C. | 4 1 | |
| Rinsing (3) | 20 seconds | 30–35° C. | 4 1 | 121 ml/m² |
| Drying | 60 seconds | 70–80° C. | | |

Replenish: Amount of the replenisher
Tank: Content of the tank

The rinsing solution was used in a counter current method using three tanks from (3) to (1).

The compositions for the processing solutions are shown below.

| Color developing solution | Tank | Replenisher |
|---|---|---|
| Water | 700 ml | 700 ml |
| Sodium triisopropylene(β)sulfonate | 0.1 g | 0.1 g |
| Ethylenediaminetetraacetic acid | 3.0 g | 3.0 g |
| Disodium 1,2-dihydroxybenzene-4,6-disulfonate | 0.5 g | 0.5 g |
| Triethanolamine | 12.0 g | 12.0 g |
| Potassium chloride | 6.5 g | — |
| Potassium bromide | 0.03 g | — |
| Potassium carbonate | 27.0 g | 27.0 g |
| Brightening agent (WHITEX4, Sumitomo Chemical Co., Ltd.) | 1.0 g | 3.0 g |
| Sodium sulfite | 0.1 g | 0.1 g |
| Disodium N,N-bis(sulfonatethyl) hydroxylamine | 10.0 g | 13.0 g |
| N-ethyl-N-(b-methanesulfonamidoethyl)-3-methyl-1,4-phenylenediamine sulfate | 5.0 g | 11.5 g |
| Water (make up to) | 1,000 ml | 1,000 ml |
| pH at 25° C. | 10.0 | 11.0 |

| Bleach fixing solution | Tank | Replenisher |
|---|---|---|
| Water | 600 ml | 600 ml |
| Ammonium thiosulfate (700 g per liter) | 100 ml | 100 ml |
| Ammonium sulfite | 40 g | 40 g |
| Iron(II) ammonium ethylenediaminetetraacetate | 55 g | 55 g |
| Disodium ethylenediaminetetraacetate | 5 g | 5 g |
| Ammonium bromide | 40 g | 40 g |
| Nitric acid (67%) | 30 g | 30 g |
| Water (make up to) | 1,000 ml | 1,000 ml |
| pH at 25° C. (adjusted with acetic acid or ammonium water | 5.8 | 5.8 |

The rinsing solution was ion exchanged water. Each of the calcium content and the magnesium content was not more than 3 ppm.

As is evident from the results of Tables 2 & 3, the dyes of the present invention have an absorption maximum of 680 nm or more about the reflection spectrum. Further, the dyes of the invention are stable even though the photographic material is stored at a high temperature and a high humidity. Furthermore, the remaining color of the dye of the invention is small.

EXAMPLE 11

The samples Nos. 203, 205, 210, 303, 305, 310, 403, 405, 503, 505 and 510 were prepared in the same manner as in the preparation of the samples Nos. 103, 105 and 110, except that the same amounts of the magenta couplers set forth in Table 4 were used in the third layer in place of the magenta coupler ExM.

With respect to samples, a fogged sample (25%) exposed to white light and unexposed sample (75%) were prepared using different developing solutions (Fr). The samples were exposed to light using a sensitometry (FWH type, color temperature of light source: 3,200K, Fuji Photo Film Co., Ltd.) through a color separation filter and a gradation wedge. The samples were developed with the developing solutions (Run) used in Example 1.

The exposure required for forming the magenta density of 2.0 was measured using the developing solution (Fr). The samples were subjected to the same exposure, and was continuously developed using the developing solution (Run). Then the magenta density of D(M) was measured. The difference in the density (ΔD(run–Fr)=D(M)–2.0) was determined. The large difference means that the change of photographic property caused by a continuous process is large. The results are set forth in Table 4.

TABLE 4

| Photographic material | Antiirradiation dye | Magenta coupler | Change of magenta |
|---|---|---|---|
| 103 | C-2 | ExM | –0.16 |
| 105 | C-4 | ExM | –0.13 |
| 110 | (2) | ExM | –0.04 |
| 203 | C-2 | M-7 | –0.18 |
| 205 | C-4 | M-7 | –0.14 |
| 210 | (2) | M-7 | –0.03 |
| 303 | C-2 | M-19 | –0.18 |
| 305 | C-4 | M-19 | –0.15 |
| 310 | (2) | M-19 | –0.05 |
| 403 | C-2 | M-28 | –0.17 |
| 405 | C-4 | M-28 | –0.16 |
| 410 | (2) | M-28 | –0.06 |
| 503 | C-2 | A | –0.17 |
| 505 | C-4 | A | –0.15 |
| 510 | (2) | A | –0.10 |

Magenta coupler A

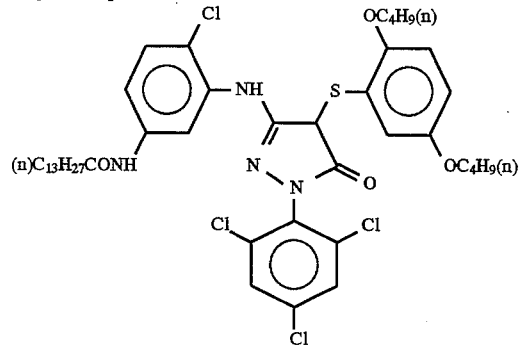

It is evident form the results shown in Table 4, the magenta density is scarcely reduced after the continuous processing using the samples using the dyes of the present invention. This effect is particularly remarkable where the dyes are used in combination with the magenta coupler represented by the formula (II).

We claim:

1. A pyrazolone-pentamethine oxonol compound represented by the formula (Ib):

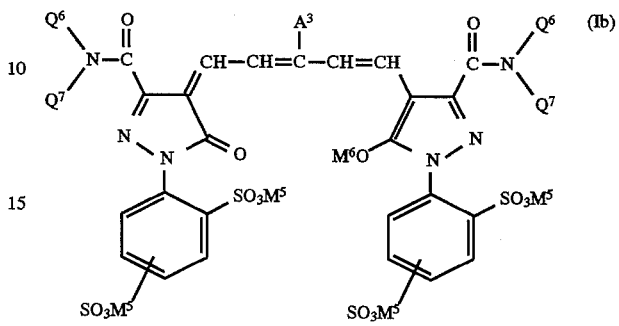

in which $A^3$ is methyl, ethyl or sulfoethyl; each of $Q^6$ and $Q^7$ independently is hydrogen, methyl, ethyl or sulfoethyl; $M^5$ is sodium or potassium; and $M^6$ is hydrogen, sodium or potassium.

2. The pyrazolone-pentamethine oxonol compound as claimed in claim 1, wherein $A^3$ is methyl.

3. The pyrazolone-pentamethine oxonol compound as claimed in claim 1, wherein $Q^6$ is hydrogen.

4. The pyrazolone-pentamethine oxonol compound as claimed in claim 1, wherein $Q^7$ is hydrogen, methyl or ethyl.

5. The pyrazolone-pentamethine oxonol compound as claimed in claim 1, wherein the compound is represented by the formula (Ic):

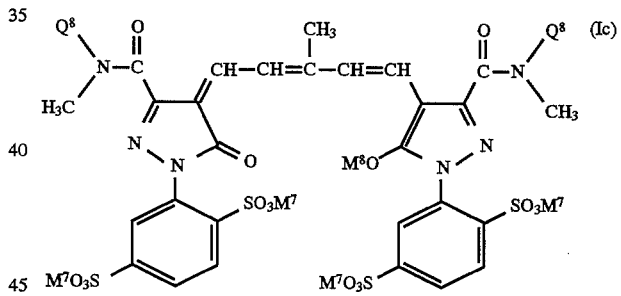

in which $Q^8$ is hydrogen, methyl, ethyl or sulfoethyl; $M^7$ is sodium or potassium; and $M^8$ is hydrogen, sodium or potassium.

* * * * *